United States Patent
Alexander et al.

(10) Patent No.: US 12,159,155 B1
(45) Date of Patent: Dec. 3, 2024

(54) EDGE COMPUTING SYSTEM

(71) Applicant: Amazon Technologies, Inc., Seattle, WA (US)

(72) Inventors: James Michael Alexander, Oakton, VA (US); Aaron Lockey, Round Rock, TX (US); Oscar Padilla, Georgetown, TX (US); Aldon Dominic Almeida, Austin, TX (US); Rishikesh Bola Satyanarayan, Santa Clara, CA (US); Maksim Vakhno, Pleasanton, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 466 days.

(21) Appl. No.: 17/512,482

(22) Filed: Oct. 27, 2021

Related U.S. Application Data

(62) Division of application No. 16/570,824, filed on Sep. 13, 2019, now Pat. No. 11,188,376.

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| | | | |
|---|---|---|---|
| 8,392,838 B2 | 3/2013 | Chawla | |
| 2013/0074066 A1 | 3/2013 | Sanzgiri | |
| 2013/0204927 A1* | 8/2013 | Kruglikov | H04L 67/01 709/203 |
| 2013/0232485 A1* | 9/2013 | Murray | G06Q 30/0633 718/1 |
| 2016/0378529 A1 | 12/2016 | Wen | |
| 2018/0039478 A1* | 2/2018 | Sung | G10L 15/1815 |
| 2018/0095774 A1* | 4/2018 | Atta | G06F 15/76 |
| 2020/0089520 A1* | 3/2020 | Ravi | G06F 9/544 |
| 2022/0171648 A1* | 6/2022 | Rodriguez | G06F 9/45533 |

* cited by examiner

*Primary Examiner* — Jacob D Dascomb
(74) *Attorney, Agent, or Firm* — K&L Gates LLP

(57) ABSTRACT

Devices and techniques are generally described for an edge computing system. In various examples, the edge computing system may comprise a host kernel comprising a kernel-based virtual machine hypervisor. In some examples, the edge computing system may comprise virtualization software effective to communicate with the kernel-based virtual machine hypervisor to execute guest virtual machines. In various further examples, the edge computing system may comprise an engine virtual machine with access to at least one hardware component. The edge computing system may further comprise a control plane virtual machine. The control plane virtual machine may include components effective to receive a first request and determine an application corresponding to the first request, and a virtual machine manager effective to control the virtualization software to generate a virtual machine, configured in accordance with a configuration specific for the virtual machine, for executing the application.

20 Claims, 18 Drawing Sheets

EDGE COMPUTING SYSTEM

CROSS REFERENCE TO RELATED APPLICATIONS

This application is a divisional of U.S. patent application Ser. No. 16/570,824, filed Sep. 13, 2019, the disclosure of which is incorporated herein by reference in its entirety.

BACKGROUND

Networked "smart" devices, sometimes referred to as "Internet-of-Things" or "IoT" devices, are able to communicate data with one or more other devices on a local network and/or with one or more back-end systems, such as web applications and/or services, over the internet. Such devices are increasingly commonplace in households, the workplace, and in industrial settings. For example, smart thermostats are able to remotely communicate with a web server that may, in turn, communicate temperature data to an end user. Typically, an end user of a smart thermostat may receive current thermostat data from the web service and may control the thermostat through a companion application executing on the user's mobile device and/or through a web application. Similarly, a web service associated with the thermostat may receive temperature data and/or control setting data from the thermostat and may track statistical data and/or perform other computations that may be useful to the end user. The end user may access such information from the back-end service through a web application and/or a companion mobile application. Additionally, the back-end service may send software updates to the smart thermostat and/or may send push notifications to the end user through a companion application. Examples of other smart devices include smart speakers, virtual assistants, smart refrigerators, smart lighting systems, security systems, locks, various sensors, etc. In various examples, smart devices, such as those described above, may communicate with remotely-located computing devices (e.g., devices providing back-end services) and/or with one another through a base station or hub. Additionally, in some examples, such hubs and/or base stations can enable different smart home devices to communicate with one another when the devices use communication protocols that are otherwise incompatible.

DETAILED DESCRIPTION

Figure 1:
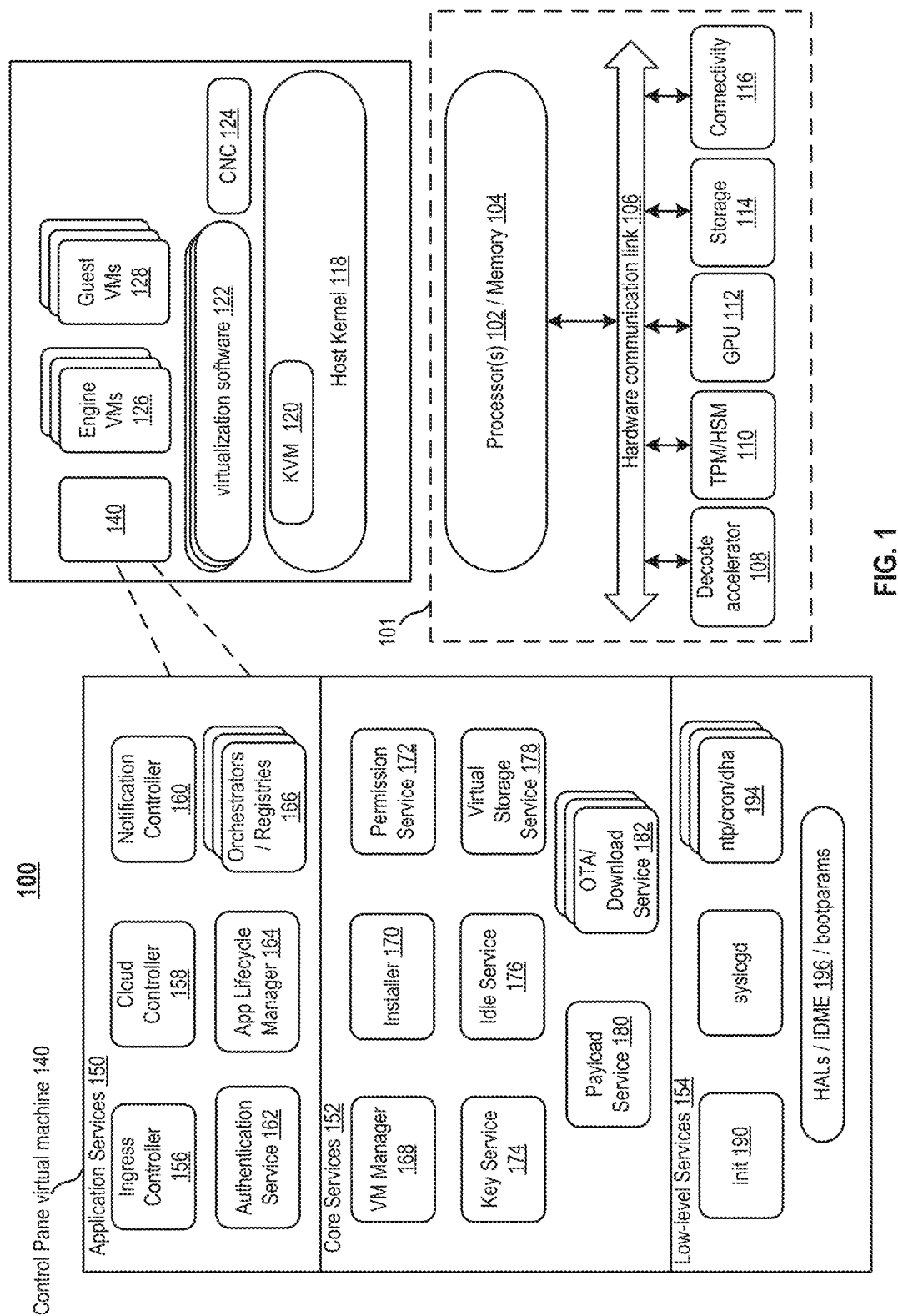
FIG. 1 is a block diagram depicting an example edge computing system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

"Smart" devices, as used herein, may refer to various devices that include at least one processor, at least one memory, and communication hardware (e.g., a network card, an antenna, short-range wireless communication technologies, etc.). Smart devices may be effective to communicate with other devices using various communication protocols. In addition, in at least some examples, smart devices may communicate with one or more remote computing devices (e.g., "back-end" systems including servers and/or serverless computing systems) over the internet. In various examples, the back-end systems may offer computing services and/or may store data associated with the smart devices. Accordingly, as used herein, "back-end" systems refer to remote computing systems and/or services provided by such systems that are accessible by a smart device over a network. In at least some examples, the back-end systems may have access to increased computing resources relative to the hardware resources of the smart devices themselves.

In an example, a smart device may be a home security system comprising a camera including a microprocessor, memory, and communication hardware. The camera may capture image data and may transmit the image data over the internet (e.g., through a wired or wireless access point) to a back-end system associated with the camera. The back-end system may perform image and/or video processing that may be beyond the capabilities of the local hardware of the camera. For example, the back-end system may perform one or more computer vision techniques to identify persons and/or objects represented in the image data captured by the camera and may send push notifications to a mobile device associated with a user of the camera. However, in various examples, such back-end processing may introduce significant latency (e.g., due to network congestion) that may result in impractical results and/or user annoyance.

Accordingly, described herein is an edge computing system that may be used to perform various services associated with smart devices locally while providing enhanced security features. As used herein, "edge device" may refer to a computing device providing access to back-end systems (such as back-end enterprise servers) associated with various smart devices. The smart devices may be communicatively coupled to the edge device over a wired or wireless local area network (LAN/WLAN). Edge devices may provide computation capability and/or storage capability at a location that is physically proximate to where such computation and/or storage is needed. For example, a base station that communicates with a smart camera on a local area network (LAN) and provides one or more computer vision techniques for video data captured by the camera may be an example of an "edge" device. In various examples, edge devices may provide access to one or more back-end services associated with the edge device. The ability to perform various services locally as opposed to remotely by back-end services, may offer reduced latency. Additionally, the edge computing system described herein may offer increased computing capability relative to one or more hardware-constrained smart devices that communicate with the edge computing system. Accordingly, various computing operations may be "off-loaded" from the smart device to an edge computing system that is local to the smart device. "Local," as used herein, may refer to devices that may communicate with one another over a LAN and/or via direct peer-to-peer communication, as opposed to over a wide area network (such as the internet).

As used herein, "system" refers to hardware and software components upon which other applications (e.g., third party smart device applications and/or other software) may be deployed and executed. As used herein, applications refer to software that may be executed to perform various services. A single application may comprise multiple operations and/or processes. In various examples, different components of the edge computing system described herein may perform different operations and/or processes of an application. For example, as described in further detail below, an application may be deployed by an edge computing system across multiple guest virtual machines, with each guest virtual machine deploying one or more processes and/or operations of the application.

In various examples, the edge computing systems described herein may be executed by a hub or base station computing device (e.g., host computing device 101) that may be configured in communication with one or more smart devices. For example, the edge computing system may be an operating system executing at least in part on a base station computing device communicating on a LAN within a user's home.

Further, as described herein, the edge computing system may be designed in such a way as to emphasize security and privacy of data within the software stack of the edge computing system. For example, the edge computing system may control access to application-specific data and may provide security measures effective to prevent unauthorized access to data. Additionally, the edge computing system may control access to underlying host resources of the physical computing device(s) upon which the edge computing system executes. Further, the edge computing system may control and/or limit communication of data between different applications installed and/or executing on the edge computing system.

FIG. 1 is a block diagram depicting an example edge computing system 100 and a host computing device 101 executing edge computing system 100, according to various embodiments of the present disclosure. Various components of FIG. 1 may be omitted in various implementations of the edge computing systems described herein. Further, additional components apart from what is depicted in FIG. 1 may be added, depending on the desired implementation.

Edge computing system 100 may be executed by one or more physical machines (e.g., one or more computing devices). For example, edge computing system 100 may be executed by host computing device 101. The host computing device(s) may comprise one or more processors 102 (e.g., one or more single-core and/or multi-core processors). The one or more processors 102 may be configured in communication with memory 104 (e.g., random access memory). In various examples, memory 104 may be effective to store various instructions selected from a native instruction set of the edge computing system. The instructions may be used to program the one or more processors 102 to perform various processes and/or to instantiate the various components of the edge computing system 100 described in further detail below. Further, the one or more processors 102 may be effective to retrieve data stored in a storage 114.

The one or more processors 102 may comprise any suitable processors. For example, the one or more processors 102 may comprise one or more digital signal processors (DSPs), general purpose processor cores, and/or graphical processing units. Similarly, storage 114 and memory 104 may include one or more different types of memory, data storage, or computer-readable storage media devoted to different purposes within the edge computing system 100.

The one or more processors 102 may communicate with various other hardware components of the host computing device 101 via communication link 106. Communication link 106 may include one or more communication links (e.g., one or more buses) that may transmit data between various hardware components of the host computing device 101 executing edge computing system 100. Data may be sent serially or in parallel depending on the particular implementation. Additionally, the communication link 106 may be classified into a certain number of bits (e.g., 16-bit, 32-bit, 64-bit, etc.) that describes the number of bits that the communication link 106 is able to transmit in parallel. The bit classification of a particular communication link 106 may depend on the design of the particular bus (and/or on the design of one or more of the processors 102 communicatively coupled to the bus). In various examples, the communication link 106 may be used to transfer data, may include address lines for accessing particular memory addresses (e.g., in storage 114), may supply power to various hardware components, and/or may provide a system clock that may be used to synchronize various signal and components communicating via the communication link 106.

In various examples, the host computing device 101 may comprise various hardware components that may be communicatively coupled to the one or more processors 102 and/or the memory 104 via the communication link 106. For example, the host computing device 101 may include an accelerator 108, a trusted platform module (TPM), and/or a hardware security module (HSM) 110 (subsequently referred to as TPM/HSM 110), an artificial intelligence (AI) acceleator application specific integrated circuit (ASIC) used for machine learning, a graphics processing unit (GPU) 112, storage 114, and/or connectivity component 116.

Accelerator 108 may be a hardware acceleration component (e.g., a hardware accelerator circuit) effective to perform one or more operations that may improve the speed and/or performance of functionality of the computing system relative to executing the same operations in software on a general purpose processor. In various examples, the accelerator 108 may comprise one or more ASICs, programmable circuits (e.g., field-programmable gate arrays (FPGAs)), and the like. The accelerator 108 may perform operations effective to increase the processing speed, reduce power consumption, lower latency, increase parallelism, improve utilization of various other components, etc. In general, accelerator 108 may include circuits that may be used to perform any processing task that may be performed by a general purpose processor. However, the use of a dedicated accelerator 108 may improve performance of that processing task by off-loading the processing task from the general purpose processor to the special purpose hardware of the accelerator 108. Since the accelerator 108 is designed and/or programmed to perform one or more specific tasks, use of accelerator 108 may achieve performance efficiencies relative to the use of the general purpose processor (e.g., one or more processors 102) for the same task.

Various examples of accelerators 108 may include a network processor, and/or network interface controller (e.g., an NPU and/or NIC), a digital signal processor (DSP), an analog signal processor, a cryptographic accelerator to perform hardware-based encryption, a codec accelerator, a physics processing unit, an image/video decoder circuit, an image/video encoder circuit, a data compression accelerator, etc. In various examples, a TPM, an HSM 110, an AI accelerator, and/or GPU 112 may be dedicated hardware accelerators that may be described as part of accelerators 108. However, the TPM, HSM 110, AI accelerator, and/or GPU 112 may be described as separate components herein for conceptual clarity due to various implementations of host computing device 101 making use of such components. However, in various examples, a TPM, an HSM 110, an AI accelerator, and/or a GPU 112 may be considered as a subset of accelerator 108 and/or as a subset of hardware acceleration components.

HSM 110 may be a hardware component of host computing device 101 that may store cryptographic keys used for encryption of data. In various examples, TPMs and/or HSMs may be used to protect data in storage 114 by making the data inaccessible until a system verification and/or authentication process is completed. TPMs may be hardware-based components which include a key that may be used for asymmetric encryption. TPMs can generate, store, and protect other keys used during encryption/decryption processes. An HSM is a security component that may be added to encrypted computing systems to manage, generate, and securely store cryptographic keys. HSMs may be instantiated as a dedicated hardware component (e.g., as a removable hardware component such as a PCI card) and/or may be an external device accessible via a network using transmission control protocol/internet protocol (TCP/IP). By contrast, TPM may be a dedicated chip or chipset. While HSMs may be added to and removed from a system or network, TPMs are typically installed during manufacturing of a motherboard and are thus integrated into the device. In some embodiments, both TPMs and HSMs may use the Rivest-Shamir-Adleman (RSA) algorithm to generate an RSA key. An RSA key uses a public key/private key pair to encrypt and decrypt data. In the case of TPMs, the RSA key may be directly encoded during the manufacture of the chip (e.g., "burned" into the chip). In HSMs, the HSM is the hardware root of trust (ROT) within the cryptographic system where RSA keys are securely stored. One skilled in the art will appreciate that other cryptographic techniques such as elliptic curve encryption may also be used depending on the application.

The RSA key (e.g., the private key) of the TPM/HSM 110 is inaccessible outside of the host computing device 101, thereby enabling the edge computing system 100 to authenticate the cryptographic information received from external sources (e.g., from smart devices communicating with the host computing device 101 on the LAN). The RSA key may be inaccessible due to its storage in separate memory that may only be accessed by privileged hardware instructions. In the case of the TPM, the key may be directly encoded during the manufacture of the chip, as described above. In HSMs, the private key may be stored in physically separate memory that may only be accessed via privileged hardware instructions.

AI accelerator and/or graphical processing unit (GPU) 112 may be dedicated hardware accelerators used for specialized processing tasks. Generally, GPUs are electronic circuits designed to manipulate and alter memory to accelerate the creation of image data in a frame buffer. The GPU may be embedded on the motherboard and/or may be present on a video card (e.g., a PCI card). GPUs may be used to perform parallel calculations related to three-dimensional (3D) graphics. Additionally, GPUs may be used to accelerate memory-intensive graphical processing operations such as texture mapping, polygon rendering, geometric calculations (e.g., rotation, translation, sheer, etc. of vertices of 3D representations into different coordinate systems). Other capabilities of GPUs may include texture manipulation, interpolation, anti-aliasing, high precision color mapping, discrete cosine transforms (DCT) and other frequency-based transforms, computer vision, motion compensation, intra-frame prediction, quantization, inter-encoding, etc.

In various examples, an AI accelerator circuit may be configured in communication with other hardware components via communication link 106. The AI accelerator circuit may be effective to perform operations on tensors (e.g., matrix multiplication), as described below. In various examples, the AI accelerator circuit may comprise ASICs and/or programmable circuits configured to perform a large volume of low precision computation, as compared to GPUs. In other embodiments, other tensor-processing circuits may be used in accordance with the host computing device 101. Tensor processing may be used to accelerate neural network and/or other machine learning computations. Additionally, implementing tensor processing in an ASIC may enable the decreased consumption of energy relative to a functionally equivalent programmable circuit (e.g., a GPU). Generally, dedicated tensor processing circuits are designed to perform matrix multiplication, summation, and activation function processing. Matrix multiplication is often computationally-intensive. Accordingly, a dedicated tensor processing unit may enable the edge computing system 100 executing on host computing device 101 to perform various machine learning tasks locally instead of sending such tasks to a remote cloud-based server. Local execution may reduce latency and thus provide an improved user experience and improved local-processing capability.

Storage 114 may comprise one or more disk drives of non-volatile storage. Storage 114 may comprise a disk drive, solid state drive, flash memory, and/or any other type of non-volatile storage medium. The one or more processors 102 may communicate with storage 114 via communication link 106. For example, the one or more processors 102 may load data from storage 114 into memory 104.

Connectivity component 116 may comprise a network interface card (NIC) effective to connect to the computing device to a network. Generally, connectivity component 116 may implement the physical layer and the data link layer of the Open Systems Interconnection model (OSI model). The physical layer refers to the electrical and physical aspects of devices, specifying how a device sends and receives information (e.g., via copper wires, fiber-optic cables, etc.). The data link layer may divide information sent by the network into frames for transmission over the physical layer. In various examples, the data link layer may also perform various aspects of error correction and/or addressing to enable distinguishing from different devices in a network. The connectivity component 116 may allow the computing device to access the LAN provided by a router. The router, in turn, may be connected to a modem providing access to the internet. Accordingly, the connectivity component 116 may provide for communication with other devices on the LAN as well as with remote computing devices accessible via the internet. The router may act as the access point for internet communication. As used herein LAN may refer to both wired and wireless local area networks. Additionally, connectivity component 116 of host computing device 101 may comprise both wireless and wired communication technologies. For example, connectivity component 116 may include wireless NICs effective to wirelessly communicate data with one or more other devices via a WLAN using the IEEE 802.11 standard.

The various hardware components (e.g., one or more processors 102, memory 104, communication link 106, decode accelerator 108, TPM/HSM 110, TPU/GPU 112, storage 114, connectivity component 116, etc.) may be part of a host computing device 101 that, in turn, may be a part of host computing device 101. Although referred to as a computing device, host computing device 101 may comprise multiple different computing devices that may be included in one or more physical hardware groupings or "boxes."

In various examples, memory 104 may be physically dispersed between various chip sets and/or hardware components of host computing device 101. For example, a first portion of memory 104 may be deployed on a motherboard along with the one or more processors 102. Additionally, in some examples, one or more on-board GPUs may be deployed on the motherboard. In addition, a second portion of memory 104 may be deployed on-board with respect to other hardware components, such as TPU/GPU 112. Additionally, in some examples, connectivity component 116 may comprise a platform controller hub (PCH) and/or a peripheral component interconnect (PCI) bus.

Upon booting, host computing device 101 executes its operating system. Any desired operating system may be used in accordance with the various embodiments described herein. In various examples, in a virtualized environment such as that described herein, host computing device 101 may be referred to as the "host" device, which "hosts" one or more virtualized computing environments, as described in further detail below.

The host operating system may comprise a host kernel 118. The host kernel 118 is a computer program that controls the host operating system and access to system resources. The host kernel 118 is typically loaded after the bootloader during start-up of the host computing device 101. The host kernel 118 performs start-up operations, handles input-output requests from software, and translates the input/output requests into instructions executable by the one or more processors 102. Additionally, the host kernel 118 controls memory 104, storage 114, and peripheral devices. The code of the host kernel 118 is typically loaded into a protected kernel space in memory 104 that is protected from access by application programs and/or from other non-critical components of the host operating system. The host kernel 118 controls access to the one or more processors 102 (e.g., thread scheduling, etc.), manages hardware devices (such as memory 104, communication link 106, decode accelerator 108, TPM/HSM 110, TPU/GPU 112, storage 114, connectivity component 116, etc.), and handles interrupts in the protected kernel space within memory 104.

The host kernel 118 may have access to the memory 104 and may control access by various processes executing on the one or more processors 102 to memory 104. In various examples, the host kernel 118 controls access to memory 104 using virtual addressing. Virtual addressing refers to making a physical memory address appear to be another address called the "virtual address." Virtual address spaces allow different programs to access memory 104 as if no other programs apart from that program were currently executing, preventing applications from crashing one another.

On many systems, a program's virtual address may refer to data which is not currently in memory. The layer of indirection provided by virtual addressing may enable the host operating system to use other non-volatile data stores, such as storage 114, to store what would otherwise be stored in a volatile memory 104 (e.g., RAM). As a result, the host operating system can allow programs to use more memory 104 than the system has physically available. When a program needs data which is not currently in memory 104, the processor(s) 102 signals to the host kernel 118 that a request for such missing data has been received, and the host kernel 118 may respond by writing the contents of an inactive memory block of memory 104 to storage 114 (if necessary) and replacing the inactive memory block with the data requested by the program. The program can then be resumed from the point where it was interrupted.

Virtual addressing may also enable creation of virtual partitions of memory in two disjointed areas, one being reserved for the host kernel 118 (e.g., the "kernel space") and the other for the applications (e.g., the "user space"). The applications are not permitted by the processor(s) 102 to address the kernel space memory, thus preventing an application from damaging the running kernel.

Additionally, the host kernel 118 provides access to peripherals and other hardware through device drivers. A device driver is a computer program that enables the operating system to interact with a hardware device. It provides the operating system with information on how to control and communicate with a certain hardware component. The driver translates operating system-mandated function calls (sometimes referred to as "programming calls") into device-specific calls effective to control the hardware.

A process may execute a system call to request a service from the operating system's host kernel 118 that the process normally does not have permission to run. System calls provide the interface between a process (e.g., an application) and the host kernel 118. Most operations interacting with the system require permissions not available to a user level process. For example, input/output for a hardware component present on the system and/or communication with other executing processes requires the use of system calls.

A system call is a mechanism that is used by the application program to request a service from the operating system. System calls employ a machine-code instruction that causes the processor(s) 102 to change modes. An example would be from supervisor mode to protected mode where the operating system performs actions like accessing hardware devices or a memory management unit. Generally the operating system provides a library for interfacing between the operating system and normal programs (e.g., a C library such as GNU C (glibc package) or Windows API). The library handles the low-level details of passing information to the host kernel 118 and switching to supervisor mode. System calls include close, open, read, wait and write. During execution, a process accesses various services provided by the host kernel 118. The library is used to invoke the various host kernel 118 functions.

The method of invoking the kernel function varies from kernel to kernel. If memory isolation is in use, a user process (e.g., a process executing in the user space) is not permitted to call the kernel directly, because that would be a violation of the processor's access control rules. However, the user process may use a software-simulated interrupt. An interrupt is a signal to the processor(s) 102 indicating an event that requires immediate attention. An interrupt alerts the processor to a high-priority condition requiring interruption of the current code being executed by the processor(s) 102. Software-simulated interrupts are available on most hardware.

Another system call option available on some host kernels 118 is a call gate. The call gate is a special address stored by the host kernel 118 in a list in kernel memory at a location known to the processor(s) 102. When the processor(s) 102 detect a call to that address, it instead redirects to the target location without causing an access violation. This requires hardware support, and so may be unavailable in some implementations. In another example, a system call instruction may be used to access the host kernel 118. System call instructions typically require hardware support and thus may be unavailable in some implementations.

In various examples, a virtualization module may be executed on the host kernel 118 to allow the host kernel 118 to function as a hypervisor. A hypervisor may be software, hardware, and/or some combination of hardware and software that may generate and execute virtual machines (e.g., a guest computing environment hosted by one or more physical machines). Typically, hypervisors are divided into "Type 1" hypervisors or "bare-metal" hypervisors and "Type 2" or "hosted" hypervisors. Type 1 hypervisors run directly on the host device's hardware while Type 2 hypervisors run as a program on an operating system of the host.

In general, the embodiments described herein describe an implementation using a Type 2 hypervisor (and more particularly using the Kernel-based Virtual Machine (KVM) in the Linux kernel). However, it should be appreciated that a Type 1 hypervisor may instead be used in accordance with the desired implementation of the edge computing system 100.

Generally, control plane virtual machine 140 implements a portion of the operating system of edge computing system 100 that controls generation of new virtual machines (e.g., creation of new guest virtual machines 128) and start/stop of existing virtual machines (e.g., guest virtual machines 128, engine virtual machines 126, and/or primitives). Once a guest virtual machine 128 is started and is running, control plane virtual machine 140 is not involved with the flow of data between the guest virtual machine 128 and the corresponding device (e.g., a smart device on the LAN) or back-end service. Instead, the code, applications, and/or devices executed by the guest virtual machines 128 may implement network communication with back-end services and perform guest-specific processing according to their specific configurations.

Figure 2:
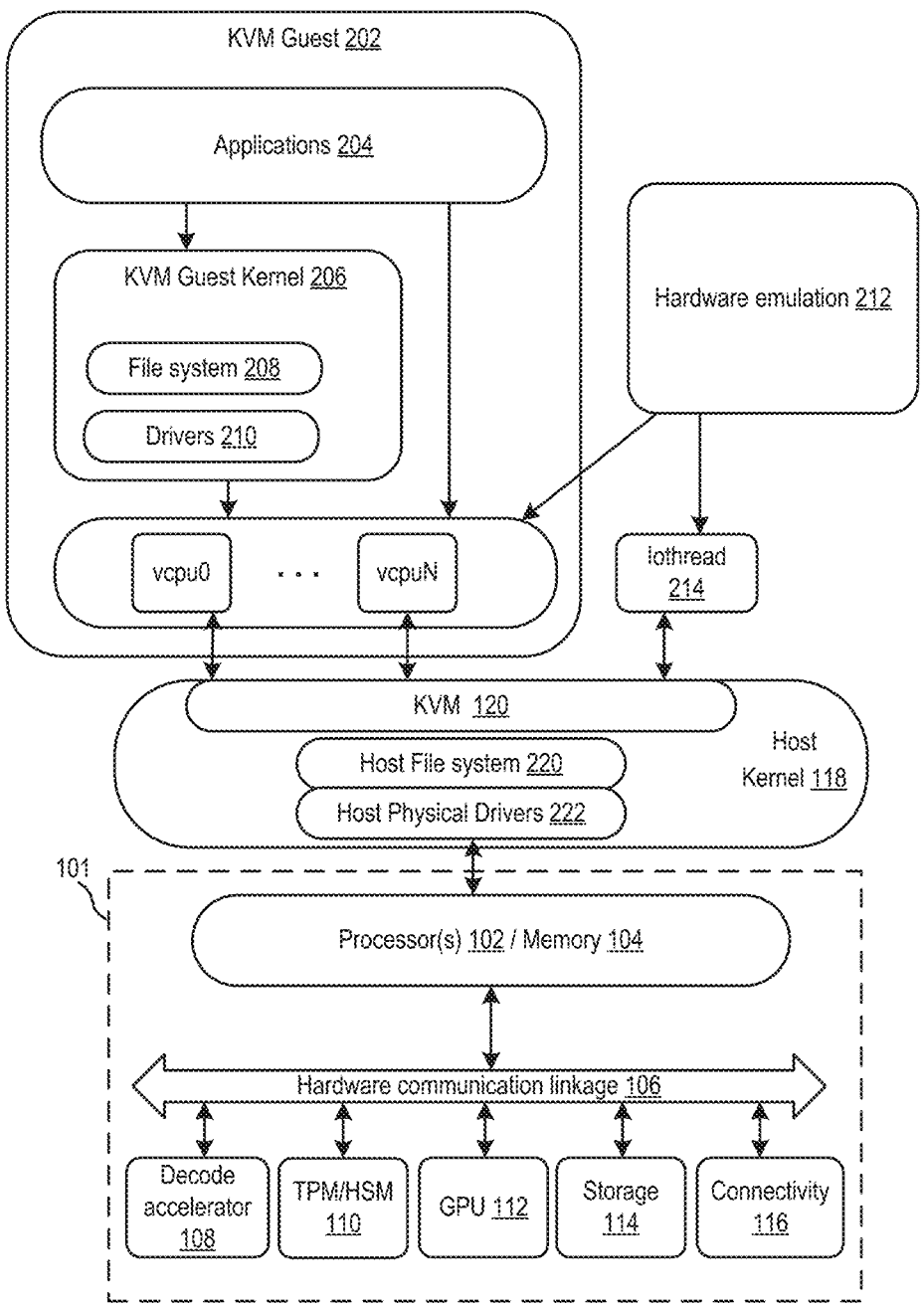
FIG. 2 depicts a block diagram of an example kernel-based virtual machine component (KVM), in accordance with various aspects of the present disclosure.

In FIG. 1, KVM 120 is executed by host kernel 118. A kernel-based virtualized environment is depicted and described in reference to FIG. 2. KVM is a virtualization module of the Linux kernel. KVM uses hardware support in the form of a processor with hardware virtualization extensions such as Intel VT or AMD-V. KVM 120 is loaded into memory 104 and utilizes the processor(s) 102 and a user-mode driver QEMU (and/or other hardware emulation system) for hardware emulation 212 to emulate a hardware layer upon which virtual machines can be created and executed.

KVM guest 202 is an example of a guest virtual machine that is generated by KVM 120. In various examples, one or more of guest virtual machines 128 of FIG. 1 may be KVM guests 202. In general, different virtualization software 122 may be executed by host kernel 118. Accordingly, guest virtual machines may be launched using a variety of different virtualization software depending on the particular hardware emulation requirements of a given guest virtual machine. Generally, guest virtual machines may run unmodified operating systems and may include private virtualized hardware (e.g., a network card, memory, disk, GPU, etc.). The KVM guest 202 may run one or more applications 204. The applications 204 may access the KVM guest kernel 206 (including a file system 208 and/or virtualized drivers 210 to access the emulated hardware of the KVM guest 202). In the example depicted in FIG. 2, the KVM guest has virtual processors vcpu0 . . . vcpuN. The processors and other virtualized hardware are emulated by hardware emulation 212 (e.g., QEMU).

IO thread 214 is a thread generated by hardware emulation 212 that is directed to KVM 120 executing on the host kernel 118. Additionally, IO thread 214 handles events received from the host system (e.g., host computing device 101).

KVM 120 may allocate RAM and load the code received from virtual processors of KVM guest 202 (and/or from IO thread 214). KVM guest 202 may be an example instantiation of a virtual machine using the KVM hypervisor and QEMU hardware emulation. In various examples, some of guest virtual machines 128 and/or engine virtual machines 126 of FIG. 1 may be examples of KVM guests 202, although guest virtual machines 128 and/or engine virtual machines 126 may be launched on KVM 120 using different virtualization software 122 (as described below) according to the particular hardware emulation requirements of a given virtual machine. Accordingly, while KVM guest 202 is described with particular characteristics for illustrative purposes in FIG. 2, a particular guest virtual machine 128 may not include all of the various hardware emulation described in reference to KVM guest 202.

Instead of recompiling guest code, KVM 120 may generate a thread. The thread calls the KVM 120 which then causes the host kernel 118 to switch to guest mode and to execute the KVM guest 202's code. The host kernel 118 includes a host file system 220 and host physical device drivers 222. Host physical device drivers 222 are used to access the underlying hardware of the physical host device (e.g., host computing device 101).

Guest virtual machines are isolated from one another allowing multiple guests to run securely while sharing the same physical hardware. Guest virtual machines may be isolated as the resources of the host machine (e.g., the host file system 220, host physical device drivers 222, etc.) are controlled and limited by KVM 120. In the user space of KVM guest 202, only the virtualized file system 208, virtualized drivers 210, and other resources made available by hardware emulation 212 are detectable by the guest operating system. Additionally, KVM 120 controls and limits access to the underlying host hardware (e.g., processor(s) 102, memory 104, storage 114, etc.). Accordingly, the KVM guest 202 is "sandboxed" and isolated from other guest virtual machines (e.g., any other virtual machines executing on the host computing device 101) and from the underlying physical host device. Additionally, the different points where an unauthorized user can try to enter data or extract data from the system (e.g., the "attack surface") may be minimized as a malicious attacker is unable to detect the underlying host device apart from the interfaces between the guest virtual machine and the host system.

However, for at least some applications and/or operations, virtual machines that include full, unmodified copies of operating systems may be slow to load and/or may consume a large amount of computing resources to operate. Accordingly, various other virtualization technologies have evolved to increase the speed and flexibility of virtualization. One example of such a technology is a containerization. A container is a virtual runtime environment that runs on a single operating system kernel and emulates an operating system rather than the underlying hardware. Compared with virtual machines, containers increase performance (e.g., throughput) and reduce latency as containers do not emulate underlying hardware and do not include full copies of operating systems. Containers enable faster startup relative to virtual machines, and have lower compute-resource overhead, thereby enabling higher density deployment on the host system. However, containers lack hardware virtualization technologies (e.g., VT-x and VT-d) and thus have relaxed isolation controls and are often considered less secure relative to virtual machines.

Various virtualization technologies attempt to address the security concerns surrounding containers while providing the speed, scalability, and low compute overhead benefits offered by containerization. One such approach are the Firecracker virtual machines provided by Amazon Technologies, Inc., of Seattle, WA. Virtualization software 122 comprises virtualization technology (e.g., a software virtual machine monitor) that leverages KVM 120, and other virtualization features to run lightweight virtual machines at near-native speeds. Firecracker virtual machines are often referred to as "lightweight" virtual machines or "microVMs" as the Firecracker virtual machines provide an alternative to QEMU-based device emulation. Firecracker virtual machines provide minimal device emulation to the guest operating system and omit non-essential functionality (e.g., VGA, BIOS, etc.) to achieve faster startup and reduced memory requirements relative to traditional virtual machines. For example, Firecracker virtual machines may be launched in less than 120 ms.

Figure 3:
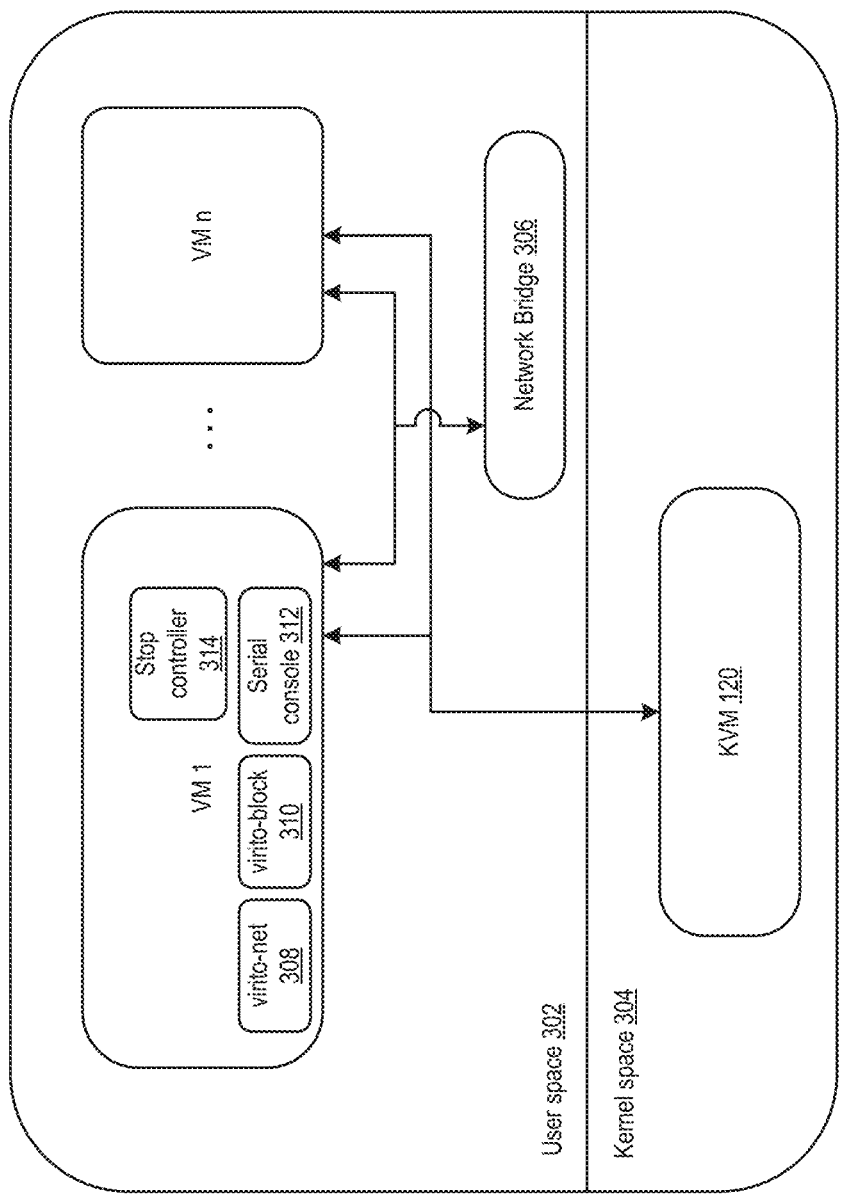
FIG. 3 depicts a virtualized environment, in accordance with various aspects of the present disclosure.

Firecracker 122 executes in the user space and communicates with KVM 120 to enable container-based multi-tenancy using KVM 120 on Linux-based kernels (e.g., host kernel 118). FIG. 3 depicts a virtualized environment that may be employed by various implementations of the edge computing system 100 described herein. In various examples, FIG. 3 may execute Firecracker virtual machines, as described in further detail below.

In the various examples below, Firecracker virtual machines are described. However, it should be appreciated that other virtualization technologies may be used in accordance with the various embodiments described herein. However, virtual machines and other virtualized computing environments that do not store complete copies of operating systems (and may therefore be described as "lightweight") may be advantageous in the various embodiments described herein due to the relative speed at which such "lightweight" virtual machines may be deployed and due to the scalability and lower compute requirements of such technologies. One skilled in the art will realize that the techniques described herein are not tied to the use of Firecracker virtual machines and any other virtualization technology that has similar or additional features compared to Firecracker can be used to implement aspects of the techniques described herein.

In order to start a Firecracker virtual machine, Firecracker binary (e.g., virtualization software 122 of FIG. 1) may be executed. A RESTful application programming interface (API) may be exposed by the Firecracker virtualization software 122. An InstanceStart command may be used in the Firecracker API to deploy Firecracker virtual machines. Firecracker virtualization software 122 executes in user space 302 and uses KVM 120 to generate virtual machines. The RESTful API enables configuration of the number of virtual CPUs included in a guest virtual machine. Additionally, rate limiters may be configured via the RESTful API to support bandwidth thresholds for each guest Firecracker virtual machine.

As previously described, Firecracker virtual machines provide a reduced device model to the guest operating system while excluding non-essential functionality. For example, instead of providing hardware emulation of an entire system using QEMU, Firecracker virtual machines may include only a few emulated devices: a paravirtualized networking device, a paravirtualized storage device (e.g., a block I/O device), a serial console, a KVM clock, and a partial keyboard that may only include a single button used to reset the virtual machine. Notably, Firecracker virtual machines may lack any emulated BIOS (which may further minimize the attack surface of the Firecracker virtual machine). For example, as shown in FIG. 3, VMI may include virtio-net 308, virtio-block 310, serial console 312, and a stop controller 314 (e.g., a one button keyboard controller) used to stop the guest virtual machine. Virtio-net 308 is a paravirtualized network device driver that provides network access to the guest virtual machine. In various examples, paravirtualized devices may allow for direct communication with the hypervisor (KVM 120) to access host hardware components using paravirtualized drivers. By contrast, in full virtualization, hardware components are emulated and calls to the emulated hardware components are translated by the guest operating system (e.g., using binary translation) into calls to the underlying host hardware components. Paravirtualization may achieve performance efficiencies relative to full virtualization. Virtio-block 310 is used for block storage (e.g., access to storage 114). Serial console 312 is used for input/output access to the guest virtual machine. Stop controller 314 is used to stop the guest virtual machine. Limiting the Firecracker virtual machines to the four devices described above provide the "lightweight" or "micro" nature of the Firecracker virtual machines, enabling faster deployment and reduced computing overhead relative to traditional virtual machines. Paravirtualized devices include device drivers that communicate directly with the hypervisor (KVM 120) using hypercalls to request the desired hardware manipulations.

"Serverless" computing environments often run small amounts of code used to implement short-lived processes. Examples may include AWS Lambdas. Virtual machines may be launched to run such code (e.g., Lamdas) on demand, in response to some triggering event, for example. However, booting a traditional virtual machine may be slow, often leading to start-up latency in a "serverless" computing paradigm. Accordingly, the lightweight virtual machines (e.g., the Firecracker virtual machines) described above may be advantageous as such virtual machines implement a minimal device model to launch Linux guest virtual machines more quickly allowing for on-demand computing in response to external trigger events.

In FIG. 3, serial console 312 communicates with KVM 120 executing in the kernel space 304 of host kernel 118. KVM 120 may control access to underlying host resources (e.g., memory 104, host processor(s) 102, storage 114, etc.) and the allocation of the host resources to guest virtual machines (e.g., VM 1, . . . , VM n). Network bridge 306 may generate an aggregate network from multiple communication networks or network segments. Generation of an aggregate network may comprise combining separate networks in the data link layer (e.g., using a bridging table that forwards frames of data from the first network to the second network) such that the networks perform as a single, aggregate network.

Returning to FIG. 1, the virtualization software 122 (e.g., Firecracker and/or any desired hypervisor/virtual machine manager) may be used to deploy guest virtual machines 128. In various examples, guest virtual machines 128 may be used to execute applications and/or services corresponding to particular smart devices configured to communicate with the edge computing system 100 executing on host computing device 101. For example, the smart devices may include a smart camera, a smart thermostat, and a smart lighting system and each of these smart devices may each be associated with their own guest virtual machine 128 on edge computing system 100 to perform various tasks related to the device. Accordingly, components of the edge computing system 100 may execute as virtual machines on virtualization software 122 (e.g., as Firecracker virtual machines). The user space of host kernel 118 may be minimal with the majority of operating system functionality being implemented by a control plane virtual machine 140.

Control plane virtual machine 140 may be initiated at the end of the boot process of the host computing device by the command and control component ("CNC component") 124 (described in further detail below). The control plane virtual machine 140 may be configured with exclusive access to communication channels with the CNC component 124. The control plane virtual machine 140 may communicate with host kernel 118 and the underlying hardware using CNC component 124 to start and stop guest virtual machines, as described above.

The control plane virtual machine 140 may be separated into application services 150, core services 152, and low-level services 154. Application services 150 may be high-level services effective to respond to incoming messages from other devices on the LAN and/or to back-end systems over the internet. Application services 150 may be effective to direct network traffic to the correct guest virtual machine 128 (or other application) and may trigger launching of guest virtual machines 128 in response to received events and/or control signals.

Core services 152 may be background processes (e.g., daemons) comprising the components used to provide the high-level functionality of the application services 150. For example, the coreservices 152 may provide interfaces to components of the applications services 150 and/or the low-level services 154. The core services 152 comprise abstractions of the shared computing resources offered by the edge computing system 100 executing on host computing device 101 and maintain privilege boundaries between various guest virtual machines 128. Additionally, core services 152 may schedule and/or perform various maintenance processes such as OTA updates of the edge computing system 100, firmware updates and/or other software installs, etc. Low-level services 154 comprise hardware abstraction layers (HALs) and other foundational components of Linux server software stacks.

Generally, control plane virtual machine 140 may cause new guest virtual machines to be launched in response to control signals and/or events. For example, one of the application services 150 (e.g., ingress controller 156) running within control plane virtual machine 140 may receive an input/data that corresponds to some event. Based on the input/data, the appropriate application service may determine what type of processing needs to be performed on the input/data. Once that is determined, another appropriate application service may, in conjunction with one of the core services 152 (e.g., key service 174) determine authorization for staring a guest virtual machine to process the input/data. If it is determined that a guest virtual machine 128 is to be started in response to the event, the VM manager 168 uses APIs to send a sequences of messages to the CNC component 124. CNC component 124 may start and configure a new guest virtual machine 128. Notably, the CNC component 124 and virtualization software 122 may be the only user space processes executing outside of virtual machines. Accordingly, data for all user space processes may be isolated using virtualization technologies to provide enhanced security and minimize the potential attack surface of edge computing system 100. Accordingly, the edge computing system 100 architecture isolates guest code executing within guest virtual machines 128 from the functions of control plane virtual machine 140, as the guest code is executing on separate systems and interface with the control plane virtual machine 140 and the underlying host only through the command and control component 124 and virtualization software 122.

In addition to guest virtual machines 128 and the control plane virtual machine 140, the edge computing system 100 may comprise local implementations of database, storage, service discovery, and/or messaging (MQTT) primitives. In FIG. 1, these primitives can be part of the engine virtual machines (VMs) 126. However, these primities do not need to be part of engine VMs 126 and could be separate entities running inside their individual VMs. Each of the primitives may be implemented in a virtual machine to prevent side channel attacks from unauthorized guest virtual machines 128. The primitives of the edge computing system 100 are services that applications running in guest virtual machines 128 can use to offload common operations/functionality in order to simplify the application code. In various examples, Amazon Technologies, Inc., of Seattle, WA's Lambda service may be a primitive that may execute code (e.g., Java, Ruby, Python, etc.) to perform desired operations, in response to triggering events (e.g., a function call received over HTTP/HTTPS and/or a triggering event message (e.g., MQTT) received from a hardware sensor, etc.) without requiring the administration of compute resources and in a serverless environment. Storage related to the primitives is local to the host device (e.g., host computing device 101), enabling stronger privacy protection and lower latency relative to cloud-based alternatives. However, application developers (e.g., developers of applications running within guest virtual machines 128) may program their applications to use cloud-based storage and/or any remote back-end services, as desired.

Authentication service 162 authorizes and authenticates applications executing in guest virtual machines 128. For example, authentication service 162 may allow an application running in one or more guest virtual machines 128 to authenticate tokens received from a back-end web service associated with the application. Additionally, authentication service 162 may determine granular permissions describing which services of edge computing system 100 are accessible by a particular application. Permission data may be stored by permission service 172. For example, a particular application may include permissions allowing the application to access an engine virtual machine that deploys speech-processing models. Additionally, the permissions of permission service 172 may define which primitives are accessible by a particular application.

Notification controller 160 may send push notifications to users of the host computing device 101 upon which edge computing system 100 is running. For example, notification controller may send a push notification (e.g., email, SMS, application alert, etc.) to a user's mobile device to notify the user that storage 114 is nearly full and/or that an OTA update may cause service interruption during a particular time. In some other examples, the notification controller 160 may notify a user that an application install is in progress and that a user may be required to authorize permissions for the application. Notification controller 160 may communicate with VM Manager 168, installer service 170, and/or permission service 172. Additionally, notification controller 160 may send notifications to applications executing in guest virtual machines 128 and/or engine virtual machines 126 indicating that one or more services are currently down (e.g., during a software update).

Various computing functions may access a hardware resource (e.g., accelerator 108, GPU 112, an AI accelerator circuit, etc.). Engine virtual machines 126 may include virtual machines provisioned with access (in some cases exclusive access) to the specialized hardware. For example, an inference engine may comprise machine learning models used to infer high-level events from video camera data (e.g., facial recognition, object identification and tracking, etc.). Accordingly, in various example implementations, the inference engine may have access to an AI accelerator circuit, GPU 112, and/or video decoding hardware (e.g., accelerator 108). In another example, a speech-processing engine may comprise speech processing models (e.g., natural language processing, automatic speech recognition, etc.), and may have access to GPU 112, an AI accelerator circuit, and/or other tensor-processing hardware. In another example, a crypto-engine may perform encryption/decryption for the device and, as such, may access TPM and/or HSM 110 or other hardware-based root of trust within host computing device 101.

Figure 4:
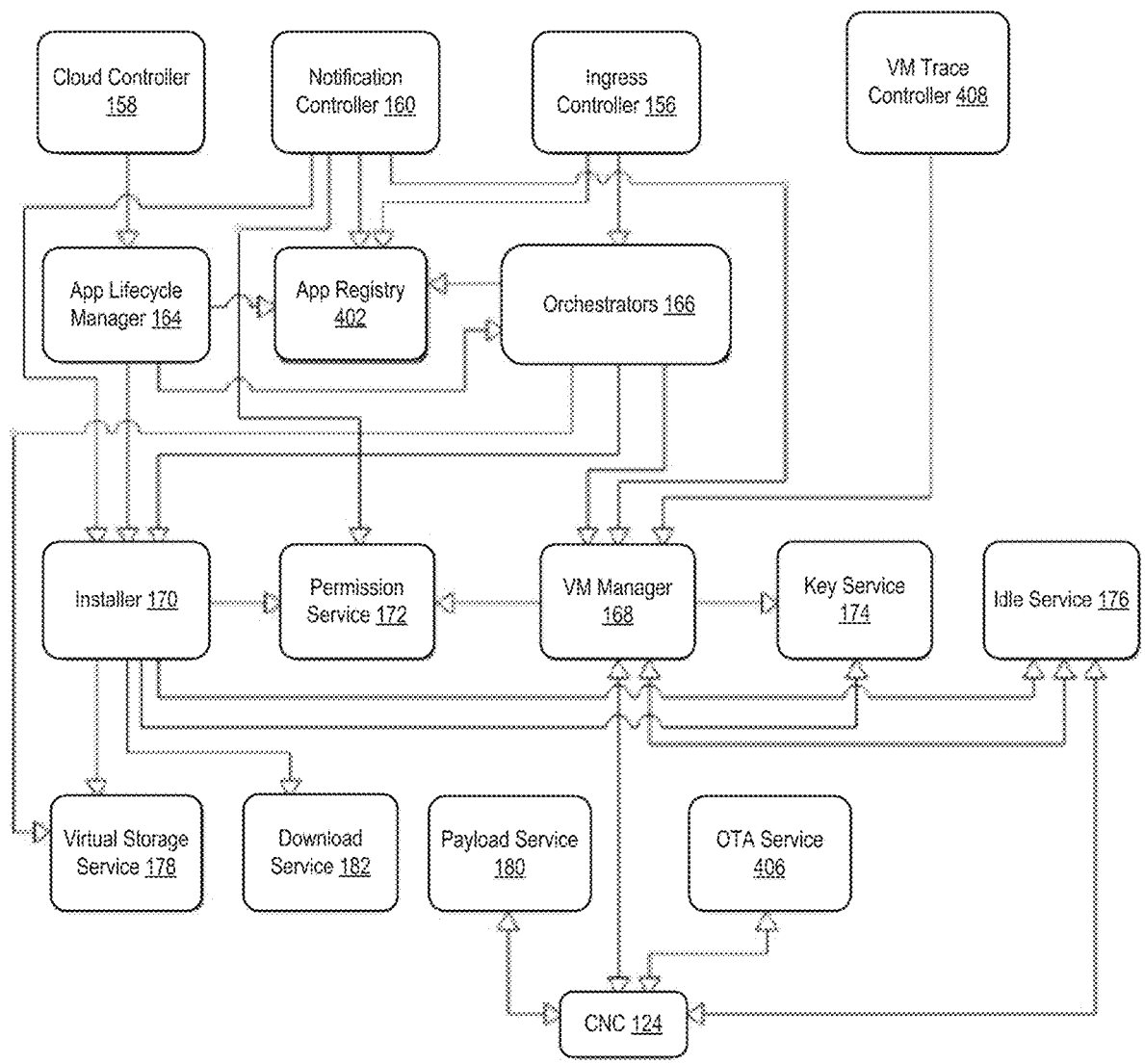
FIG. 4 depicts inter-process communication between various components of the edge computing system described herein, in accordance with various aspects of the present disclosure.

FIG. 4 depicts inter-process communication between various components of the edge computing system 100 described herein, in accordance with various aspects of the present disclosure. Cloud controller 158, notification controller 160, ingress controller 156, VM trace controller 408, application lifecycle manager 164, application registry 402, and/or orchestrator 166 may be part of application services 150 that communicate with software and/or devices outside host computing device 101 (e.g., devices on the LAN and remote devices accessible over the internet).

Installer service 170, permission service 172, VM manager 168, key service 174, idle service 176, virtual storage service 178, download service 182, and/or OTA service 406 may be part of core services 152. Core services 152 may not directly interface with components exernal to the host computing device 101 executing edge computing system 100. VM manager 168, installer service 170, key service 174, and/or permission service 172 may have elevated privileges associated with their respective functions. In various examples, processors may include different modes that allow the operating system to execute at different privilege levels. Tasks may be tagged with a corresponding privilege level. If a task attempts to access a resource or execute a privileged instruction, the processor(s) may determine whether the task has the appropriate privilege level. If not, a protection fault interrupt may be generated to prevent the task from performing the action. Access to VM manager 168, installer service 170, key service 174, and/or permission service 172 may be controlled by privileges delegated by the operating system. Accordingly, each of VM manager 168, installer service 170, key service 174, and/or permission service 172 may have a separate control interface so that each component is separately accessible, for security reasons. Accordingly, accessing one of VM manager 168, installer service 170, key service 174, and/or permission service 172 does not necessarily provide access to others of VM manager 168, installer service 170, key service 174, and/or permission service 172. Separate access privileges may be required for access to each of VM manager 168, installer service 170, key service 174, and/or permission service 172.

It should be appreciated that various components of edge computing system 100 may be omitted depending on the particular implementation. Furthermore, additional components apart from what is shown and described may be included in edge computing system 100, in accordance with the desired implementation.

Cloud controller 158 receives commands from remote computing device(s) associated with the edge computing system 100 (e.g., a back-end cloud service associated with the edge computing system 100). In various examples, the cloud controller 158 may receive application install commands, remove application commands, and/or application launch commands. Additionally, the cloud controller 158 may receive requests for state information concerning edge computing system 100 and send state information data in response. Further, cloud controller 158 may receive system reset commands and over the air (OTA) updates from the back-end systems associated with edge computing system 100.

In various examples system, the application install commands and/or application launch commands may be related to first party applications configured to operate/execute on the edge computing system 100. As depicted in FIG. 4, the cloud controller 158 may communicate with application lifecycle manager 164. For example, the cloud controller 158 may send application install packages to application lifecycle manager 164 for applications to be installed on edge computing system 100. As described in further detail below, the application lifecycle manager 164 may provision and/or designate resources of edge computing system 100 for a particular application during install. Additionally, application lifecycle manager 164 may manage the lifecycles (e.g., start, stop, reset) of guest virtual machines 164. In various examples, the cloud controller 158 may maintain a connection with a back-end cloud service associated with the edge computing system 100. The cloud controller receives control instructions from the back-end cloud service and performs actions in response to the instructions. As previously described, the instructions received by the cloud controller 158 may be instructions related to various specific operations (e.g., install application, remove application, and/or launch application). After processing the instructions, the cloud controller 158 may send a response to the back-end cloud service to confirm receipt of the instructions and/or to confirm that the appropriate action was performed. In various examples, the cloud controller 158 may queue received instructions in a buffer and may process the instructions stored in the buffer as processing resources are available. Queueing the instructions in a buffer may enable the cloud controller 158 to be fault tolerant in case the network connection is interrupted. For example, queued instructions may be executed when network connectivity is restored and/or while the edge computing system 100 is offline.

Ingress controller 156 may be a service that receives incoming service requests over the network. Examples of service requests may include HTTP, HTTPS, MQTT, etc. Ingress controller 156 may convert the incoming requests to instructions for VM Manager 168 to launch one or more virtual machines (e.g., guest virtual machines 128 and/or engine virtual machines 126) associated with the particular service request. Ingress controller 156 communicates over IPC with various orchestrators and/or registries 166 (generally referred to herein as orchestrators 166). For example, ingress controller 156 may communicate over IPC with application registry 402, and various orchestrators 166 (e.g., a VM orchestrator, a container orchestrator, and/or a Lambda orchestrator). Application registry 402 may store data identifying applications and/or resources associated with applications using, for example, a uniform resource identifier (URI). Application registry 402 is described in further detail below.

Ingress controller 156 may receive HTTP and/or HTTPS requests when communicating with back-end services and/or web applications pertaining to guest virtual machines 128. Similarly, ingress controller 156 may receive MQTT signals from a device communicating on the LAN (e.g., sensor data detected by a smart device communicating on the LAN with the host computing device 101 executing the edge computing system 100). Edge computing system 100 may launch an appropriate application/service in response to receipt of such signals by the ingress controller 156, as described with reference to an example below.

For example, a smart thermostat may send an MQTT message to the edge computing system 100. The message may include data indicating a current temperature in the vicinity of the smart thermostat. Ingress controller 156 may receive the MQTT message and may route the temperature data to the appropriate guest virtual machine 128 (e.g., a guest virtual machine 128 executing a Lambda) for processing. In some embodiments, ingress controller 156 may receive the MQTT message and may send the data to application registry 402 to determine the appropriate application (e.g., by matching the uniform resource identifier (URI) associated with the appropriate application) and/or service associated with the MQTT message. After receiving data identifying the application from application registry 402, ingress controller 156 may send the data identifying the application and/or service to the appropriate orchestrator registry. For example, the MQTT message may include a URI. The URI may be associated in application registry 402 with a Lamda that processes temperature information. After determining the appropriate Lambda (and/or other resources) from application registry 402, the ingress controller 156 may send the MQTT message to the appropriate orchestrator 166 (e.g., a Lambda orchestrator). The Lambda orchestrator may, in turn, communicate with VM manager 168 to launch the guest virtual machine 128 that, in turn, executes the appropriate application code (e.g., a Lambda to process temperature data received with the MQTT message).

Advantageously, in the above example, the application developer for the smart thermostat need not manage the lifecycle of the guest virtual machine 128, the Lambda, and/or other aspects of the application code. Instead, edge computing system 100 may launch the appropriate service (e.g., a guest virtual machine 128 including a container, a Lambda, and/or other application code) in response to the incoming workload (e.g., the MQTT message). For example, the application developer does not need to supply an initialization service and/or watchdog service to manage the lifecycle of their application services. Instead, the edge computing system 100 controls the application (and the services thereof) execution. Guest virtual machines 128 may not be directly accessible via the LAN. As such, ingress controller 156 may route incoming service requests (e.g., MQTT data, HTTP data, etc.) to the appropriate guest virtual machine 128. For example, ingress controller 156 in conjunction with application registry 402 may map an application or service identifier to the appropriate application/service within the edge computing system 100. Additionally, the ingress controller 156 communicates with the appropriate orchestrator which communicates with VM manager 168 to execute the appropriate guest virtual machine 128 that includes the code used to execute the particular application service.

VM trace controller 408 may be an API used to extract performance data and debugging data from guest virtual machines 128. For example, a third party application developer may deploy an application on edge computing system 100 in one or more guest virtual machines 128. VM trace controller 408 may allow the third party developer to access trace data describing lifecycle events of their virtual machines and/or applications deployed thereon. Lifecycle events may refer to creation, optimization, management, and decommisioning of the virtual machines. Accordingly, VM trace controller 408 may allow developers to extract data concerning the performance of virtual machines deployed on edge computing system 100.

Payload service 180 may be a core service 152 (FIG. 1) responsible for secure sharing of memory 104 between virtual machines (e.g., guest virtual machines 128 and/or engine virtual machines 126). Payload service 180 may be used to allocate memory when filesystem access is too slow for a particular process, when sharing via duplication creates synchronization problems, and/or when loading the data into memory for each application has a memory footprint that exceeds a threshold percentage of the total memory. For example, a frame of video—which may be too large to load into memory for multiple different applications that need to perform processes on the video frame—may be stored in a shared memory allocated by payload service 180. Payload service 180 may allocate the shared memory to multiple guest virtual machines 128 and/or engine virtual machines 126 that perform processes on the frame of the video according to permissions granted by permission service 172.

Without payload service 180, it might otherwise be necessary to execute processes that need to share memory (e.g., share a particular file or other data) within the same guest virtual machine 128. Such a scenario may lead to security concerns in the case where one virtual machine is compromised. The attacker may have access to shared between the infected virtual machine and one or more other virtual machines sharing data with the infected virtual machine. In some embodiments, running processes in separate guest virtual machines 128 may provide security and modularity benefits from a system-level perspective. Accordingly, with payload service 180, each process may run in its own virtual machine and may be provided with a shared memory space by payload service 180 and permission service 172.

Figure 5:
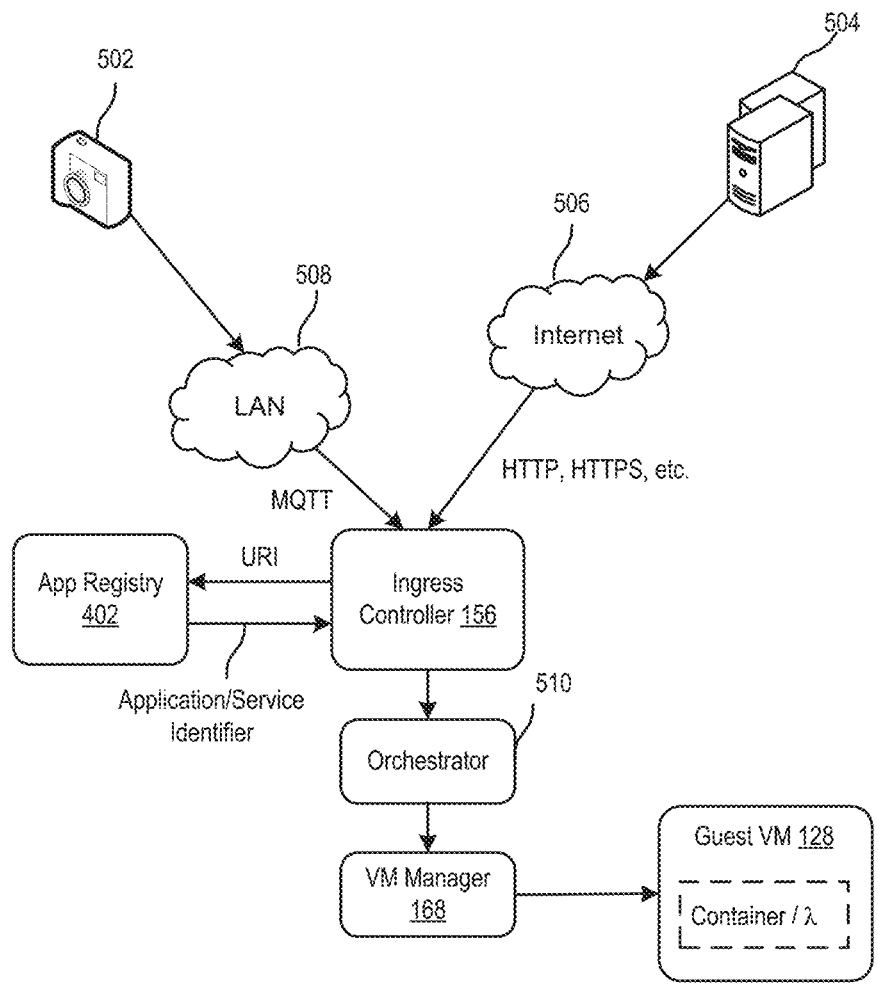
FIG. 5 is a block diagram illustrating various operations of an ingress controller, in accordance with various embodiments described herein.

FIG. 5 is a block diagram illustrating various operations of an ingress controller, in accordance with various embodiments described herein. In some examples, one or more back-end computing devices 504 may send data over the Internet 506 (e.g., a wide area network) that may be received by ingress controller 156. The signal may comprise, for example, an HTTP or HTTPS function call and/or a request sent using any desired protocol. The function call may comprise a URI associated with a particular process, application, and/or resource.

In another example, a smart device (e.g., camera 502) may send data over LAN 508 to ingress controller 156. Although, LAN 508 is shown and described in FIG. 5, it will be appreciated that a wireless area network may instead be used. The data may be an MQTT signal indicating that a passive infrared sensor of camera 502 has detected motion in an environment monitored by the camera 502. The MQTT signal may comprise a URI associated with a particular process, application, and/or resource. As used herein, the term "resource" may refer to hardware resources, functionality provided by execution of application code, and/or some combination thereof.

Ingress controller 156 may send the received MQTT signal and/or the URI from the received MQTT signal to application registry 402. Application registry 402 may perform a lookup using the URI to determine the appropriate process, application, and/or resource to handle the incoming MQTT signal. Application registry 402 may provide the application/service identifier identifying the appropriate process, application, and/or resource to ingress controller 156. Ingress controller 156 may send the application/service identifier to orchestrator 510. Orchestrator 510 may be an orchestrator corresponding to the particular type of resource. For example, if the resource is a container, orchestrator 510 may be a container orchestrator configured to specify hardware resources and deploy the container and allocate resources between containers. Additionally, the container orchestrator may determine the sequencing of container images (which may have dependencies on other images). Similarly, the resource may be a Lambda, in which case the orchestrator 510 may be a Lambda orchestrator configured to convert the incoming Lambda message (e.g., MQTT) into a function call to VM manager 168.

Orchestrator 510 may determine a configuration of the guest virtual machine 128 to be deployed based on the application/service identifier. Orchestrator 510 may generate a function call to VM manager 168 including parameters specifying the appropriate configuration of the guest virtual machine 128 and/or the application code to be executed by the guest virtual machine 128 in accordance with the application/service identifier.

In turn, VM manager 168 may launch a guest virtual machine 128 configured in accordance with the function call received from orchestrator 510. The guest virtual machine 128 may execute the Lambda, container, and/or other virtualized environment used to process the message received by ingress controller 156.

In another embodiment, ingress controller 156 may determine that the received URI is associated with an engine virtual machine 126 in application registry 402. Orchestrator 510 may then determine a configuration of the engine virtual machine 126 to be deployed based on the application/service identifier stored in application registry 402 in association with the received URI. Orchestrator 510 may generate a function call to VM manager 168 including parameters specifying the appropriate configuration of the engine virtual machine 126. However, in some embodiments, at least some engine virtual machines 126 may be started up when edge computing system 100 is booted and may be continually running. In such examples, the incoming signal/request may be routed to a previously-deployed engine virtual machine 126 instead of executing a virtual machine upon/based on receipt of the request. However, in examples where the engine virtual machine 126 is dynamically deployed, orchestrator 510 may generate a function call to VM manager 168 including parameters specifying the appropriate configuration of the engine virtual machine 126 in accordance with the application/service identifier. Further, in some examples, guest virtual machines 128 may communicate directly with engine virtual machines 126. Privileges to access a particular engine virtual machine 126 may be stored by permission service 172 when a particular application is installed. Thereafter, if a guest virtual machine 128 attempts to access an engine virtual machine 126, permission service 172 may be consulted to ensure that the guest virtual machine 128/application is authorized to access the engine virtual machine 126.

Engine virtual machines 126 may communicate with guest virtual machines 128 using any desired protocols and/or techniques depending on the particular implementation. For example, MQTT data may be communicated between engine virtual machines 126 and guest virtual machines 128 using a publication/subscriber model (e.g., "pub/sub messaging"). In another example, an engine virtual machine 126 may make data available to one or more guest virtual machines 128 using a back-end web service. In general, each engine virtual machine 126 and/or service executed by engine virtual machines 126 may specify, in an application-dependent manner, how to access data published by the engine virtual machine 126 and/or service thereof. In another example embodiment, an engine virtual machine 126 may use a remote procedure call (e.g., "gRPC") to communicate with guest virtual machines 128.

Orchestrator 510 may send a function call to VM manager 168. In turn, VM manager 168 may launch the engine virtual machine 126 configured in accordance with the function call. The engine virtual machine 126 may thereafter process the message received by ingress controller 156.

In various examples, various components of control plane virtual machine 140 may store state information concerning guest virtual machines 128. For example, a guest virtual machine 128 may be associated with a first network address (e.g., an IP address and/or a port) during a first execution cycle. Thereafter, the guest virtual machine 128 may be stopped by virtual machine manager 168. When the same guest virtual machine 128 is next executed by virtual machine manager 168, the network address may be different. However, the network address associated with the application (and/or with the guest virtual machine 128 executing the application) may be stored by control plane virtual machine 140 so that control plane virtual machine 140 is able to automatically route traffic to the correct application. For example, changing network address associated with an application may be stored in the application lifecycle manager 164, orchestrators/registries 166, application registry 402, or some other component of control plane virtual machine 140. Similarly, other state data besides network addresses may be maintained so that applications executed by the edge computing system 100 have access to the necessary data whenever the guest virtual machines 128 executing the applications are deployed.

Figure 6:
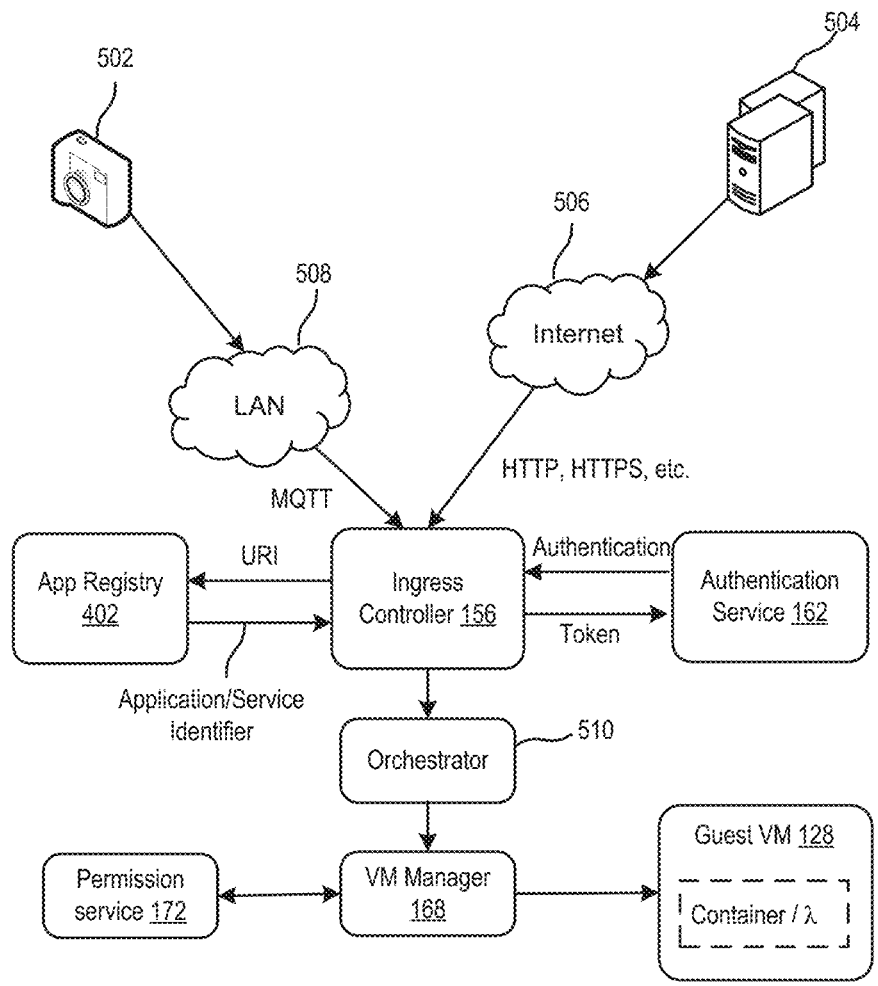
FIG. 6 is a block diagram illustrating authentication of a message received by the ingress controller, in accordance with various embodiments described herein.

FIG. 6 is a block diagram illustrating authentication of a message received by the ingress controller and deployment of a guest virtual machine 128, in accordance with various embodiments described herein. In order to authenticate the incoming message received by ingress controller 156, ingress controller 156 may send an authorization token to authentication service 162. Authentication service 162 may authenticate the message using a private key stored by a key service (for e.g., Key service 174 of FIG. 4). Authentication by authentication service 162 may authenticate the smart device attempting to perform some action using edge computing system 100. Additionally, after authentication, VM manager 168 may communicate through IPC with permission service 172 to determine permissions associated with the application (e.g., what resources the application being launched in guest virtual machine 128 has permission to access). For example, various services may be permitted to access networking components (e.g., a network interface card) whereas other services may not be permitted to access any connectivity components 116. KVM 120 may enforce restrictions and/or permissions defined by permission service 172 by restricting and/or granting access to the appropriate resources of host computing device 101.

Figure 7:
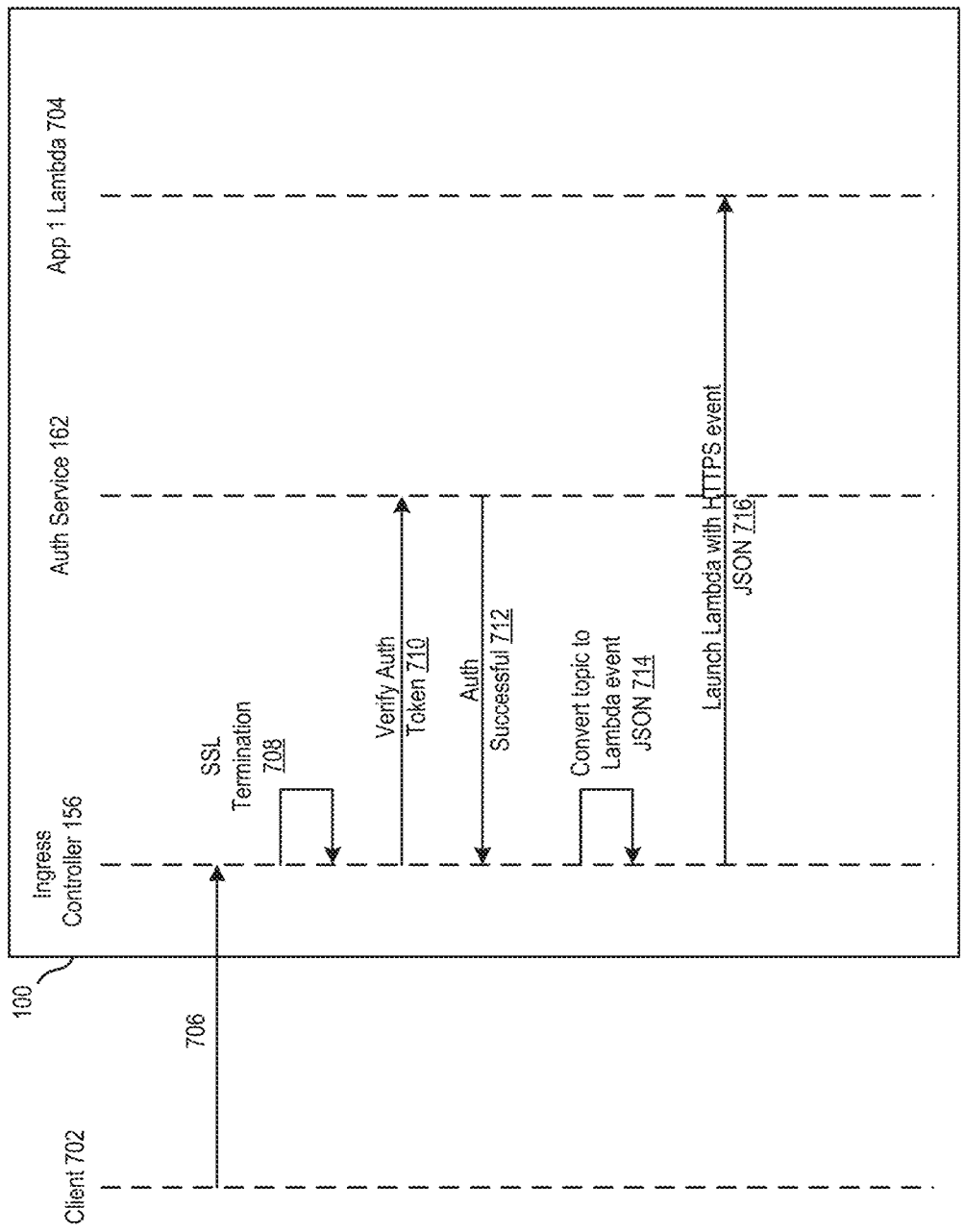
FIG. 7 is a timing sequence describing launching an application function installed on the edge computing system, in accordance with various aspects of the present disclosure.

FIG. 7 is a timing sequence describing message/data flow for launching an application function installed on the edge computing system, in accordance with one aspect of the present disclosure. Client 702 may be client device communicatively coupled to the edge computing system 100 described herein. For example, client 702 may be a smart device communicating over the LAN with host computing device 101 and edge computing system 100. The ingress controller 156 may be configured to respond to HTTPS events. In various examples, edge computing system 100 may comprise separate ingress controllers for different communication protocols (e.g., HTTP, MQTT, etc.). However, for clarity and brevity, only a single ingress controller 156 is typically described herein.

The message/data flow includes client 702 sending an authentication token to ingress controller 156 (706). Ingress controller 156 may terminate the SSL channel with the client 702 after receiving the authentication token (708). Ingress controller 156 may send the authentication token to authentication service 162 (710). Authentication service 162 may use the token to authenticate client 702. Authentication service 162 may send a message to ingress controller 156 (712) to indicate successful authentication of client 702. Ingress controller 156 may convert the HTTPS message to a Lambda JavaScript Object Notation ("JSON") event (714) (e.g., data formatted for the Lambda function). As previously described in reference to FIG. 5, the ingress controller 156 may determine the appropriate Lambda using a URI of the HTTPS message by communicating with the application registry 402. Ingress controller 156 may cause the Lambda to be launched by sending the HTTPS JSON event to a guest virtual machine 128 that is configured to execute the Lambda (716) (e.g., App 1 Lambda 704). As previously described, the ingress controller 156 may communicate with a Lambda orchestrator and VM manager 168 to configure and launch the guest virtual machine 128.

Figure 8:
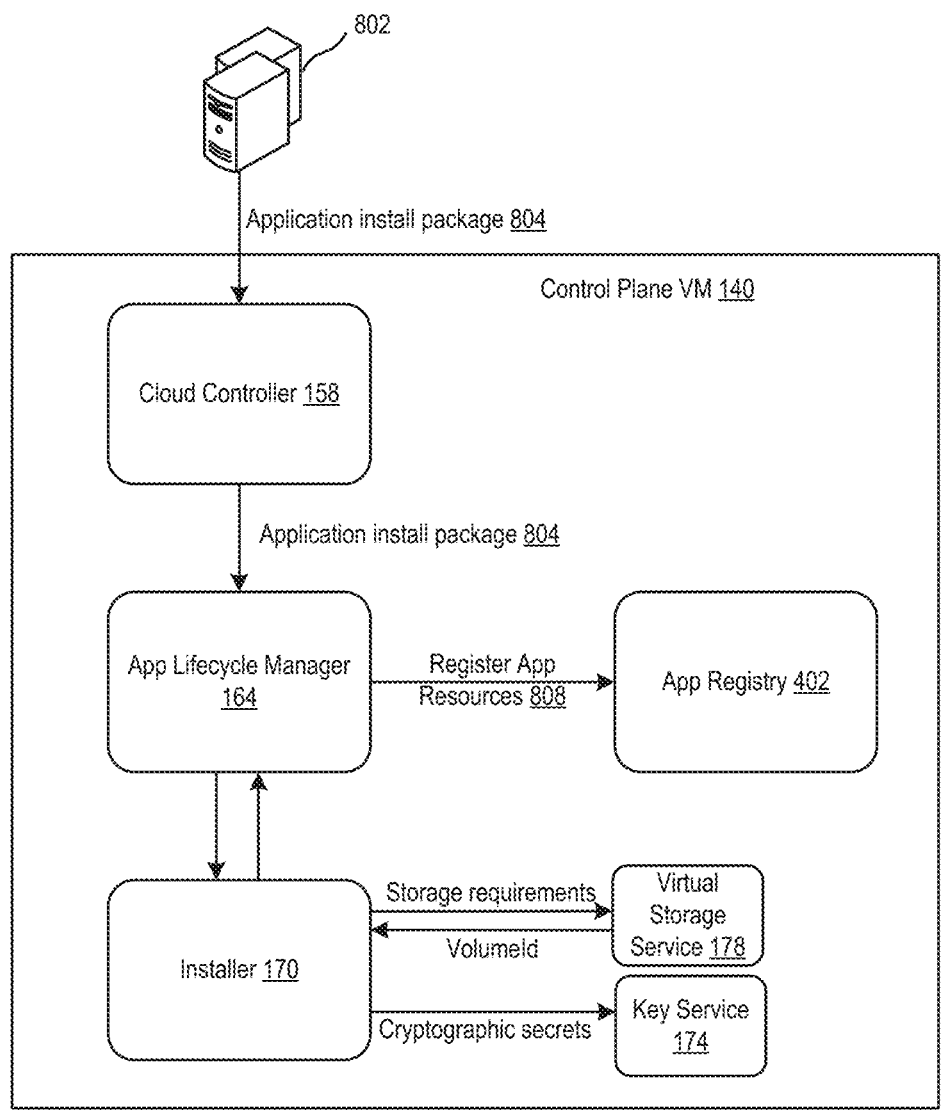
FIG. 8 is a block diagram illustrating an application install on the edge computing system described herein, in accordance with various aspects of the present disclosure.

FIG. 8 is a block diagram illustrating a process for installing an application on an edge computing system (e.g., edge computing system 100 of FIG. 1), in accordance with an embodiment of the present disclosure. A back-end system 802 may send an application install package 804 to install an application on edge computing system 100. The application install package 804 may be received by cloud controller 158. Application install package 804 may include a request to install a particular application on edge computing system 100. Cloud controller 158 may send the application install package 804 to application lifecycle manager 164. Application lifecycle manager 164 may call the installer service 170 (e.g., a core service 152).

Installer service 170 may verify application signatures included in application install package 804 (e.g., with a certificate authority). Installer service 170 may parse an application manifest included in application install package 804 that may specify installation procedures and/or resource requirements (e.g., compute requirements) of the application. Installer service 170 may provision local storage for application code, data, and/or persistent read-write layers required to install and execute the application. In order to provision the storage requirements, the installer service 170 may call virtual storage service 178. Virtual storage service 178 may provide the virtual storage volumes for the guest virtual machines 128 executing the application and may generate a Volume object defining the guest virtual machine 128 storage volume and a VolumeId object that uniquely identifies the storage volume. The Volume object is an abstraction of storage blocks from storage 114 (e.g., the storage of the host computing device 101). In various examples, virtual storage service 178 may be the only service in control plane virtual machine 140 that is privileged to create and/or modify Volume objects (e.g., the guest VM storage volumes). The VolumeId generated by virtual storage service 178 may be sent to Installer service 170. Installer service 170 may, in turn, send the VolumeId to application lifecycle manager 164. Application lifecycle manager 164 may register the VolumeId in association with the application and a URI in application registry 402. For example, application lifecycle manager 164 may store the URI, the VolumeId object (e.g., identifier data identifying the storage object resource), and application identifier, in application registry 402.

In various examples, virtual storage service 178 may generate Volume objects that are base storage layers of a stack of storage 114. Guest applications executed by guest virtual machines 128 may reference Volume objects. Volume objects may allow for resource sharing without requiring copying and/or duplication of various data in multiple storage locations. Data that is specialized (e.g., application-specific data that is not duplicated) may be stored in layers of storage 114 that are stacked on top of Volume objects.

Additionally, installer service 170 may provision any cryptographic secrets associated with the application install package 804. Cryptographic keys for the application may be stored by key service 174. After provisioning resources for the application by installer service 170, application lifecycle manager 164 may register the various resources in association with the application and one or more URIs in application registry 402. In addition, dependencies and/or preconditions related to the application (including sequencing data, IP routing/subnetting, dynamic domain name server (DNS) registration, etc.), and virtual machine parameters that constitute the application may be registered in application registry 402. In general, at action 808, any resources provisioned for the the application may be registered in application registry 402 in association with URIs identifying the resources and one or more application and/or application service identifiers. In addition, installer service 170 may register the installed application with the VM manager 168. Installer service 170 may be separated from the application services layer (e.g., application services 150) and from application lifecycle manager 164 in the application services layer due to privilege separation defined by permission service 172.

Returning to FIG. 4, VM manager 168 may configure, start, and stop guest virtual machines 128. For example, the process described in FIGS. 5-7 may be used to launch a guest virtual machine 128. Additionally, VM manager 168 employs scheduling algorithms to control access to hardware of host computing device 101 (e.g., one or more cores of processor(s) 102). Scheduling algorithms may use KVM 120 interfaces to control task scheduling on processor(s) 102.

Permission service 172 comprises information on permissions granted (and/or restrictions) for each application installed in the edge computing system 100 by the installer service 170. The permissions relate to accessing data sources under the control of the edge computing system 100 and whether an application and/or process of an application is triggered upon detection of a given event (e.g., receipt of an MQTT message, an HTTP request, etc.). In some embodiments, permissions may include identification of hardware resources accessible by an application and/or process of an application. In some embodiments, permission service 172 may not enforce the permissions defined by permission service 172. Instead, permission service 172 may authenticate whether or not an application (or a process thereof) has been granted a particular permission. KVM 120 (FIG. 1) may enforce permissions/restrictions defined by permission service 172. Permissions defined by permission service 172 may be used as a gating permission to control access to various resources of edge computing system 100. For security and privacy reasons, permission service 172 may be separated into an isolated program that can be fully audited instead of storing permissions and/or application specific data as part of another system or separately by each guest virtual machine 128. Additionally, privileges to make changes to the permissions data may be restricted to the permission service 172. Permissions may be extensible in that applications may declare their own privileges and use the declared privileges to protect application resources. Permission service 172 may be a core service 152 instead of an application service 150 for purposes of privilege separation.

Figure 9:
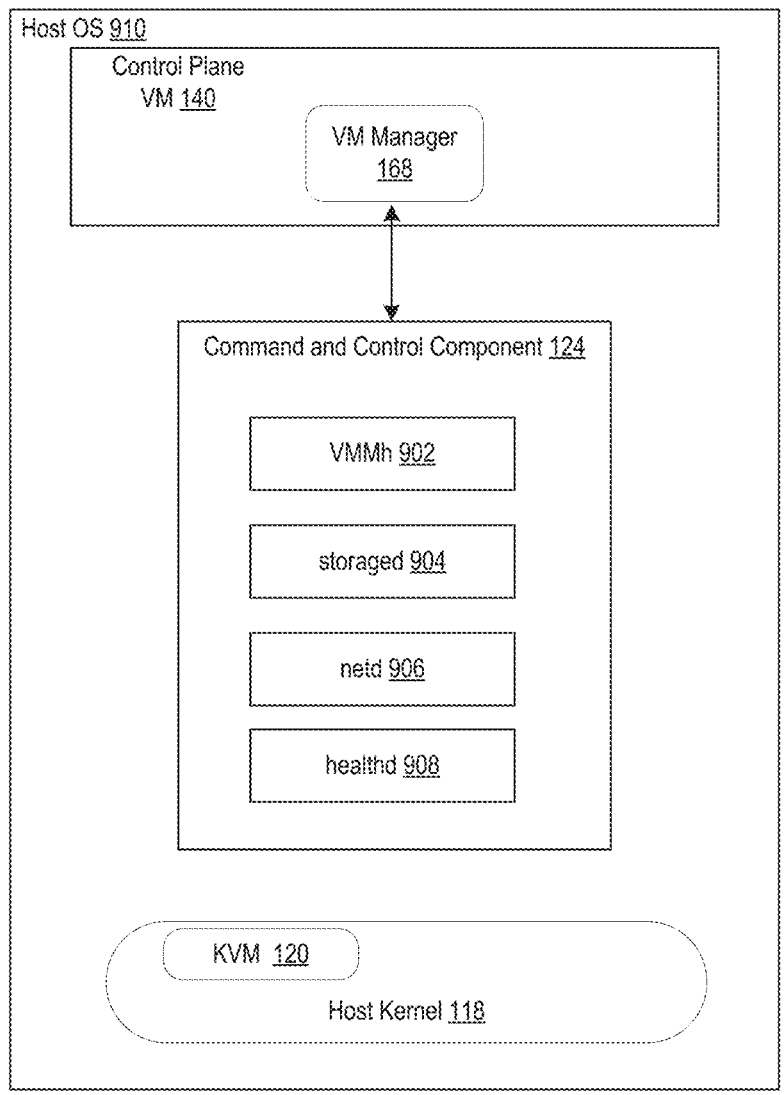
FIG. 9 is a block diagram illustrating a command and control component of the edge computing system, in accordance with various aspects of the present disclosure.

FIG. 9 is a block diagram illustrating a host operating system 910 including a command and control component 124 of the edge computing system, in accordance with various aspects of the present disclosure.

Command and control component 124 comprises background processes (e.g., daemons) VMMh 902, storaged 904 that provides a daemon, tools and libraries to access and manipulate disks and storage devices, netd 906, and/or healthd 908. Control plane virtual machine 140 may employ command and control component 124 to control the host operating system 910. However, the command and control (CNC) component 124 may be controlled by control plane virtual machine 140. For security, CNC component 124 is controlled by components in control plane virtual machine 140 and does not include any logic that allows CNC component 124 itself to take any actions absent instructions from control plane virtual machine 140.

CNC component 124 includes daemon VMMh 902. VMMh 902 communicates with VM manager 168 to start, stop, create, configure and/or decommission guest virtual machines 128. Storaged 904 is a daemon that manages host files that include virtual storage volumes. Additionally, storaged 904 responds to supported hardware events from host kernel 118 (e.g., additional and/or replaced storage 114, a newly-detected peripheral, etc.). For example, if a USB-mounted storage disk was removed, the host kernel 118 may send data to storaged 904 to indicate that the disk was removed. Storaged 904 may, in turn, notify any virtual machines using the removed disk that the storage no longer exists. Further, storaged 904 manages patching and/or updates sent to CNC component 124 through OTA service 406 (described in further detail below).

CNC component 124 includes daemon netd 906. netd 906 may be responsible for configuration and management of physical LAN network interfaces (e.g., connectivity component 116). Additionally, netd 906 may be effective to perform netfilter configuration/reconfiguration to define interconnectivity between guest virtual network interfaces and between guest virtual network interfaces and remote devices (e.g., devices accessible over the LAN and/or internet).

CNC component 124 may include the daemon healthd 908. The process healthd 908 may monitor the condition of host hardware (e.g., host computing device 101 of FIG. 1) and host foundational software layers (e.g., low-level services 154 and/or the host operating system 910). The healthd 908 may manage updates to power and thermal management policy executing in the host kernel 118.

Figure 10:
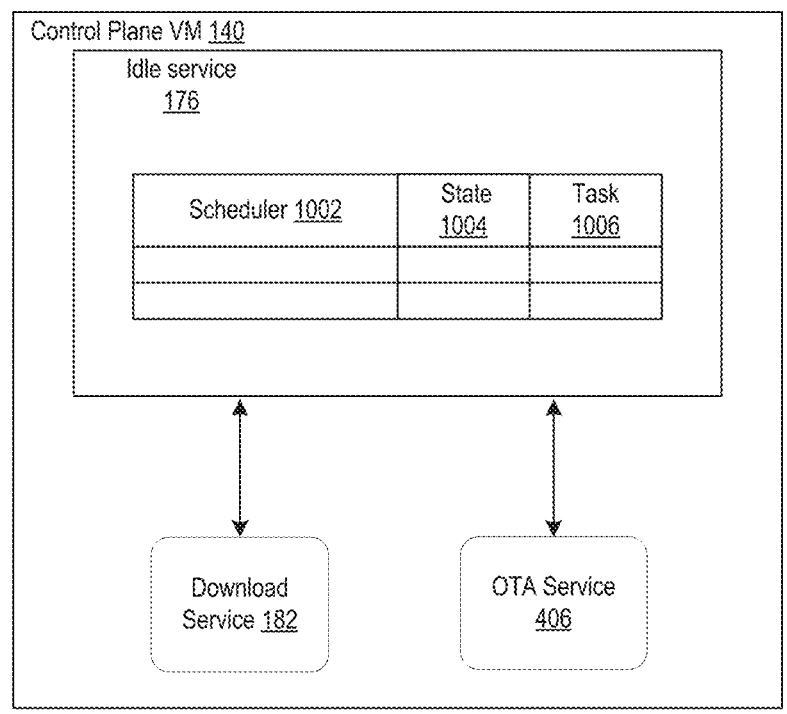
FIG. 10 depicts operations of an idle service and an over the air update service, in accordance with various aspects of the present disclosure.

FIG. 10 depicts operations of an idle service 176 and an over the air (OTA) service 406, in accordance with various aspects of the present disclosure. Idle service 176 may be used to define conditions for performing maintenance on the edge computing system 100. Conditions may include a required state of one or more processes of edge computing system 100 as a prerequisite for a maintenance operation. During a period in which the conditions are satisfied (e.g., a "maintenance window") maintenance operations may be performed. For example, system and/or application updates, log data uploads, downloads of updated machine learning models and/or software versions, software patches, storage volume resizing, etc., may be examples of actions performed during a maintenance window. Idle service 176 may store indications of various maintenance tasks 1006 awaiting execution. For example, a software update that is awaiting execution may be stored as a maintenance task 1006. Additionally, each task 1006 (e.g., each maintenance operation) may be associated with a state 1004. State 1004 may specify a state of the edge computing system 100 that should correspond to the current state prior to initiating the maintenance task. For example, a state may specify that the total processor utilization across all processor cores be below a particular percentage. In various examples, tasks 1006 associated with a particular state 1004 may be grouped together such that the tasks may be performed during the same maintenance window. Idle service 176 may interrupt the normal functionality of edge computing system 100 during updates and/or scheduled service. For example, in addition to software updates, idle service 176 may determine operations that may affect system performance and may communicate with notification controller 160 to notify other components that system performance may be interrupted and/or otherwise impacted during the particular operation. For example, an upload of log data by a guest application may affect system performance until the upload completes.

In various examples, the required state 1004 may include states relative to processes currently executing, percentage of processor being consumed, percentage of memory being used, percentage of disk, percentage of network bandwidth being consumed, etc. Additionally, the required state 1004 may specify processes that should not be running in order to perform the maintenance. In various examples, some maintenance (e.g., a system reboot) may require an idle state which may indicate that no critical active processes are currently executing. Scheduler 1002 may specify deadlines by which to complete maintenance tasks and/or may support repetition of various tasks. The scheduler 1002 may communicate with a wall clock of edge computing system 100 to schedule tasks at particular times of day. Additionally, in some examples, the idle service 176 may communicate with notification controller 160 to notify users of edge computing system 100 of service interruptions caused by maintenance operations.

In at least some examples, download service 182 may be a core service 152 configured to use networking resources (e.g., NIC) to download maintenance updates. In some embodiments, download operations of edge computing system 100 may be delegated to download service 182 rather than separately implementating download functionality. Accordingly, download service 182 may be an API for retrieving files and/or other data from various back-end computing systems over the internet. Integrating a separate download service in control plane virtual machine 140 may enable centralized throttling and/or scheduling of network usage. However, in various alternative implementations, download service 182 may be omitted from control plane virtual machine 140.

OTA service 406 may execute system updates to edge computing system 100. In various examples, the updates may be performed as defined by scheduler 1002 of idle service 176, as described above. In various examples, A/B updates may be used for systems and/or services of edge computing system 100 deemed critical, for fault recovery. Examples of critical systems may include updates to the host kernel, host user space, and the control plane virtual machine 140 image. In various other examples implementations, factory resets may be performed by OTA service 406. OTA service 406 may communicate over IPC to CNC component 124. Additionally, in various examples, OTA updates may be stored in a queue in a buffer while awaiting execution.

Figure 11:
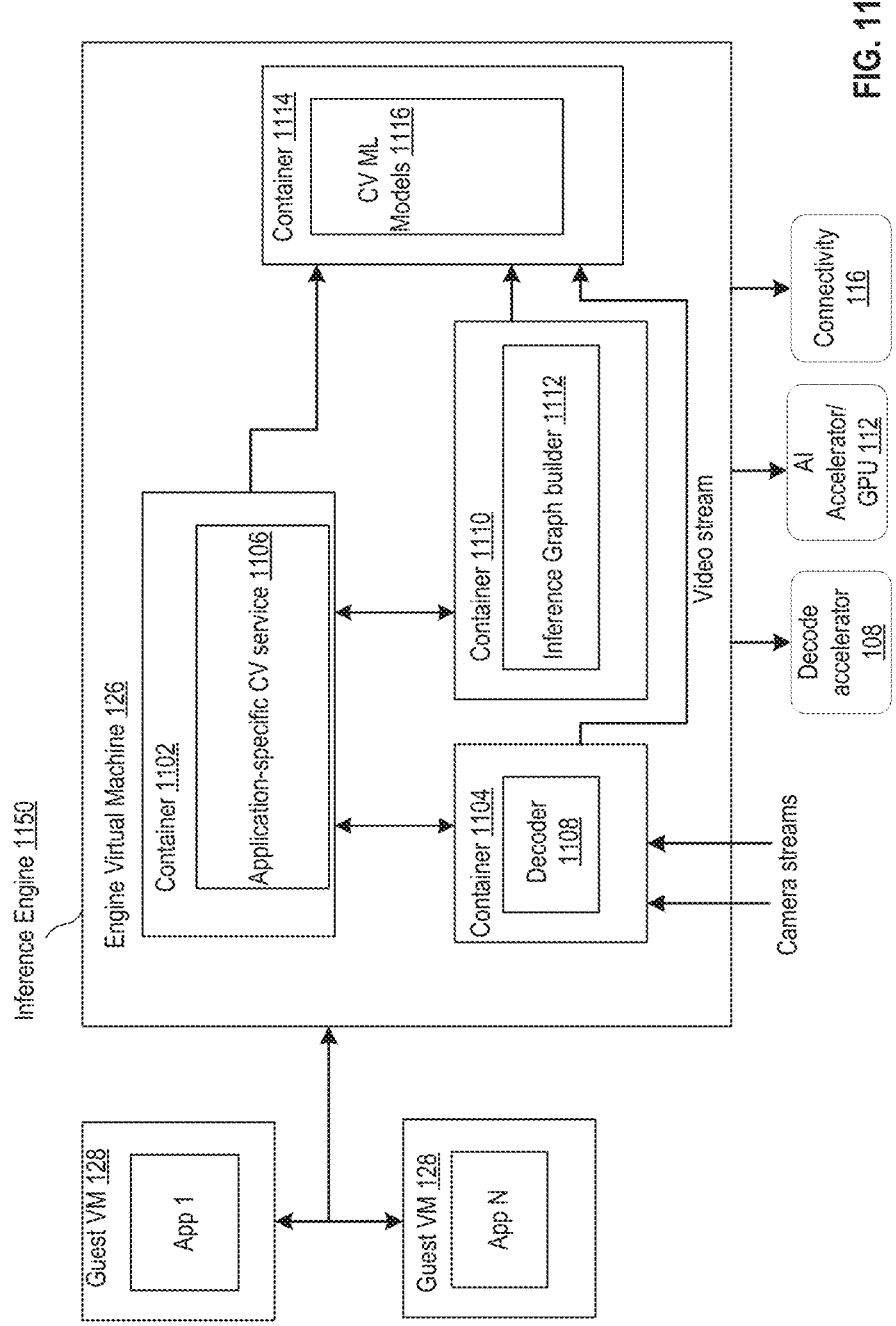
FIG. 11 is a block diagram illustrating an example inference engine of the edge computing system in accordance with various aspects of the present disclosure.

FIG. 11 is a block diagram illustrating an example inference engine 1150 that may be implemented as an engine virtual machine 126 in edge computing system 100, in accordance with various aspects of the present disclosure.

In various examples, inference engine 1150 may comprise computer vision technology implemented in edge computing system 100. In some embodiments, inference engine 1150 may have access to underlying video processing hardware of host computing device 101 (e.g., an AI accelerator circuit, GPU 112, and/or hardware accelerators configured for image/video processing such as some examples of decode accelerator 108). In some cases, inference engine 1150 may be the only virtual machine of edge computing system 100 with access to the underlying video processing hardware of host computing device 101, in order to limit access to special purpose hardware for security reasons.

Inference engine 1150 may be instantiated in an engine virtual machine 126 and may comprise one or more containers (e.g., Dockers) executing various components of the inference engine. For example, a container 1102 may execute application-specific computer vision service 1106 provided by a developer of a smart device configured in communication with the host computing device 101 executing edge computing system 100. For example, an application-specific computer vision service 1106 may visually track the location of recognized objects such as car keys and/or mobile phones. In various examples, the application-specific computer vision service 1106 may correspond to an application (e.g., App 1 . . . . App N) executing inside one or more guest virtual machines 128.

Video and/or image data may be received from a smart device communicating with host computing device 101 executing edge computing system 100 and may be decoded by decoder 1108 executing inside container 1104. In various examples, the decoded video stream and/or decoded image data may be sent from the decoder to container 1114. Container 1114 may comprise one or more computer vision machine learning models 1116 (e.g., one or more convolutional neural networks (CNNs)), and may execute the machine learning models (e.g., using the underlying host hardware provided by KVM 120 and host kernel 118).

In various examples, inference engine 1150 may comprise an inference graph builder 1112 executing inside container 1110 that may be used to decompose image data into graphs that may be used as input to one or more computer vision machine learning models 1116. For example, inference graph builder 1112 may build perception graphs that represent abstractions describing a multimedia pipeline to be used to pre-process a video stream into the appropriate form for input into downstream machine learning models. A guest application executing on one or more guest virtual machines 128 may use a configuration file to specify how the multimedia pipeline should function for that application (and/or its data). Inference graph builder 1112 may parse all such configurations, and may generate a multimedia pipeline (for processing the application's data) that satisfies the union of all computer vision applications that are to be simultaneously executed.

Inference engine 1150 may handle all video streams received by host computing device 101 executing edge computing system 100. Inference engine 1150 may decode and process the video streams using pre-installed machine learning models that guest applications may subscribe to via an API of the inference engine 1150 (e.g., models to perform object identification, face recognition, etc.). In various embodiments, application-specific computer vision models developed and installed in inference engine 1150 may be accessed using a managed interface of the inference engine 1150. In various embodiments, outflow of output data from inference engine 1150 may be restricted to final inference results (e.g., output data such as facial recognition data, object data identifying an object, etc.). In various examples, the multimedia pipeline may be generated using various computer vision algorithms and/or plug-ins (such as the open source GStreamer multimedia framework). In various examples, the implementations of such plugins may be run on hardware accelerators including video decoders/encoders and/or an AI accelerator circuit associated with the host computing device 101.

Using a centralized inference engine 1150 for video processing may ensure that privacy of video data is maintained by the edge computing system 100. For example, inference engine 1150 may be the only component of edge computing system 100 with access to video streams from cameras communicating with host computing device 101 executing edge computing system 100. Additionally, that video processing operations may be confined to hardware of the local host computing device 101 executing the edge computing system 100 to bolster user trust. Additionally, as opposed to allowing each guest virtual machine 128 to implement its own video processing processes, centralizing video processing may enable optimal use of host computing device 101 and/or edge computing system 100 resources. For example, machine learning and/or computer vision models may be specifically designed for the underlying GPU and/or AI accelerator circuit hardware. Additionally, centralized processing may be used to control the optimal point in the pipeline to decode video, to avoid unnecessary duplication of video frames (e.g., via payload service 180), etc.

Figure 12:
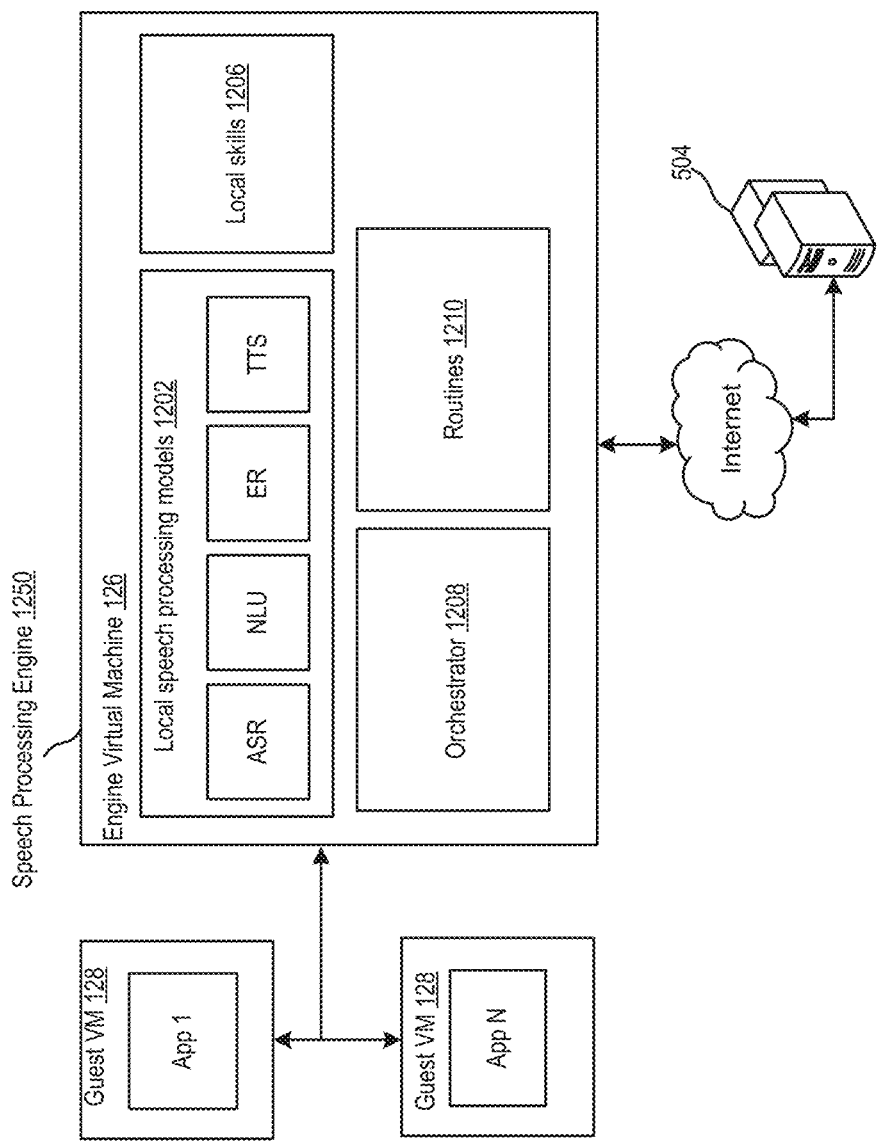
FIG. 12 is a block diagram illustrating an example speech processing engine that may be deployed by the edge computing system in accordance with various aspects of the present disclosure.

FIG. 12 is a block diagram illustrating an example speech processing engine 1250 that may be deployed by the edge computing system in accordance with various aspects of the present disclosure. The particular implementation of the speech processing engine 1250 shown in FIG. 12 is for exemplary purposes only. Other local/back-end hybrid speech processing systems may be used in accordance with other embodiments. In various examples, speech processing engine 1250 may attempt to maximize the amount of speech processing operations that are performed locally on host computing device 101. Accordingly, speech processing engine 1250 may attempt to avoid contacting back-end speech processing services when possible, in order to reduce latency and provide a better user experience relative to back-end speech processing systems. In various examples, confidence scores of the speech processing components of speech processing engine 1250 may be used to determine whether back-end speech processing systems are to be utilized in conjunction with the local speech processing services provided by speech processing engine 1250 (as opposed to use of local speech processing components alone).

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive semantic interpretation from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, TTS may receive text input and may generate audio representing the input text. For example, TTS may receive input text data (e.g., text data representing a response to a user utterance) and may generate output audio data representing the text.

Speech processing may be used in a variety of contexts, including in speech-processing enabled devices (e.g., devices employing voice control and/or "voice assistants") and/or systems. Examples of speech-processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, voice-enabled skills invoked by the Alexa system from Amazon.com, Inc. of Seattle, Washington, etc.

Speech-processing enabled front end devices (e.g., smart devices with integrated voice assistants) may include microphones (e.g., far-field microphone arrays) used to transform audio into electrical signals. Speech processing may then be performed, either locally by the speech-processing enabled device, by one or more other computing devices communicating with the speech-processing enabled device over a network, or by some combination of the speech-processing enabled device and the one or more other computing devices. In the example depicted in FIG. 12, various speech processing components may be executed by edge computing system 100. In various examples, speech-processing enabled devices may include and/or may be configured in communication with speakers and/or displays effective to output information obtained in response to a user's spoken request or command, or to output content that may be of interest to one or more user's.

A speech-controlled computing system may respond to user utterances by outputting content and/or performing one or more other actions, such as playing music, providing information, calling a taxi, displaying an image, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications that can be used to potentially respond to a user request. Speech-processing applications may be referred to herein as "skills". For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice service. Rule-based approaches and/or predefined utterance matching have been used in some systems for processing requests spoken in a certain format to invoke a particular application. In other examples, as described further below, skills may use probabilistic NLU based machine learned models to determine an action. Skill NLU models may be loaded into memory of a speech-processing system when the skill is invoked via a user utterance. In at least some examples, a "skill," "skill component,", "speech-processing skill", and the like may be software running on a computing device, similar to a traditional software application running on a computing device. Such skills may include a voice user interface in addition to or instead of, in at least some instances, a graphical user interface, smart home device interface, and/or other type of interface.

Voice-assistants with NLU models are increasing in popularity and there is a growing demand to support availability of speech processing in many contexts with a wide range of functionality. For example, there is a desire to implement natural language processing in systems that may not have persistent internet access. Some examples of such systems may include vehicle computing devices and/or other computing devices that may experience intermittent internet access or no internet access. Thus, instead of sending a user's request over an internet connection to a cloud-based NLU system for processing, local NLU implementation involves executing the NLU locally on the hardware associated with the relevant device. Current backend system NLU models have relatively large memory footprints making such models less convenient for deployment by many current client-side systems without appropriate compression. Also, compression of the models may result in cost savings being realized in backend deployments.

In addition to such "offline" systems, speech-processing skills include NLU models that extend the functionality of the main NLU models of the larger speech-processing system with which the skills interface. Since speech-processing systems interface with a large number of skills, the NLU models of individual skills may be loaded on demand, as needed to process user requests. If the skill NLU models sizes are large, loading the skill NLU models into memory may add latency to utterance recognition. Thus, small memory footprint NLU models may have significant impact on low-latency NLU response and result in an improved user experience.

As described in further detail below, NLU models may comprise speech-processing domain classification (DC), intent classification (IC), and named-entity recognition (NER) models. Domain classification may predict the general speech-processing domain class of a user utterance such as "Music," "Shopping," "Movies," etc. Intent classification may predict the user intent within a domain such as a PlayMusicIntent representing a user instruction to begin playback of a song, for example. Other examples intents may include a MovieShowTimesIntent, a BuyItemIntent, etc. NER recognizes domain-specific named entities such as artist names and/or song names for the Music domain, movie name and/or actor name for the Movies domain, etc.

Storage and/or use of data related to user utterances may be controlled by a user using privacy controls associated with a speech-processing enabled device and/or a companion application associated with a speech-processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not technically subject to them, to bolster user trust. For example, personal, contextual, and other data described herein may be treated as if it fell under acts and regulations, such as the Health Insurance Portability and Accountability Act (HIPAA) and the General Data Protection Regulation (GDPR), even if it does not actually fall under these acts and regulations.

In various examples, speech processing engine 1250 may provide various speech processing capabilities locally on host computing device 101. Implementing speech processing capability local to edge computing system 100 may reduce latency that is often experienced by users of back-end speech processing systems in which user speech is first sent over the Internet to a back-end system for processing and the results of the processing are received by a local device via the Internet to be outputted.

In various examples, speech processing engine 1250 may include containers comprising one or more speech processing models 1202 executing on edge computing system 100. For example, the speech processing models 1202 may comprise an ASR model executing in a first container image, an NLU model executing in a second container image, a TTS model executing in a third container image, and/or an entity recognition (ER) model container image (and so on). In various examples, the speech processing models included in speech processing engine 1250 may be limited in order to reduce the overall memory footprint of such models. However, speech processing engine 1250 may communicate with back-end speech processing systems to provide further speech processing functionality. Additionally, the speech processing engine 1250 may comprise one or more locally-executing skills 1206. In various examples, locally-executing skills 1206 may be application specific and/or may comprise the most commonly-used skills for a particular environment. Speech processing engine 1250 may further comprise an orchestrator 1208 and/or routines 1210. Orchestrator 1208 may manage dialog sessions and may send speech processing data between various components of speech processing engine 1250.

Routines 1210 may comprise a series of custom triggers and sequences that may be user defined. For example, a user may configure a trigger when a room temperature falls below a certain temperature (e.g., as detected by a thermostat). The sequence associated with the trigger may be to turn on the heater until a threshold temperature is reached.

Speech processing engine 1250 may bring a targeted set of speech processing skills and internet-of-things automation capabilities (e.g., via routines 1210) to edge computing system 100. Speech processing engine 1250 may include speech processing capability to control other devices communicating with host computing device 101 executing edge computing system 100 over the LAN. In various examples, speech processing engine 1250 may require significantly higher compute resources relative to other virtual machines executing on edge computing system 100 in order to execute the various speech processing models involved in SLU.

In addition to the speech processing engine and/or the inference engine described above in reference to FIGS. 11-12, engine virtual machines 126 may comprise a crypto-engine, a sensor engine, etc. In various examples, the crypto-engine virtual machine may have access to the hardware root of trust for host computing device 101 executing edge computing system 100. For example, the crypto-engine virtual machine may have access to a TPM and/or HSM 110. Access to the crypto-engine virtual machine may be delegated through key service 174.

A sensor engine virtual machine may be an engine virtual machine 126 effective to receive data from hardware sensors communicatively coupled with host computing device 101 executing edge computing system 100 such as motion sensors, temperature sensors, humidity sensors, leak sensors, proximity sensors, etc. For example, the hardware sensors may send MQTT messages that may be received by the sensor engine virtual machine. The sensor engine virtual machine may buffer the sensor data and/or the sensor data may be sent to the payload service 180 which may buffer the sensor data in virtual memory locations shared by one or more subscribing applications. In addition, the sensor engine virtual machine may send notifications to other applications (e.g., guest virtual machines 128) when sensor data is received that pertains to the guest applications. One skilled in the art will appreciate that the various engine virtual machines explained above are for illustrative purposes only. Various other types of engine virtual machines can be deployed based on the uses cases and configuration of the edge computing system 100.

Returning to FIG. 1, low-level services 154 may comprise services that abstract hardware resources of host computing device 101. Low-level services 154 may communicate with core services 152. No guest virtual machines 128 and/or engine virtual machines 126 may directly access low-level services 154.

Low-level services 154 may comprise device hardware authentication (dha) 194. dha 194 may implement interfaces required by device registration as an abstraction on top of hardware components for per-component unique identifiers and/or root secrets. The design of dha 194 is dependent on the particular hardware selected for the hardware root of trust (e.g., TPM/HSM 110) and how that hardware root of trust is exposed to higher layers of the operating system.

IDME 196 may be high-integrity storage for parameters that control the boot sequence of edge computing system 100. IDME may be a non-transitory storage medium for data that uniquely identifies individual units of a device (e.g., serial and/or model numbers of hardware components). IDME 196 may also store calibration data for components that may be calibrated during manufacturing (e.g., sensors). Such calibration data may be programmed during manufacturing. IDME 196 may be used to select between slots for subsystems that support A/B updating of the system and for enabling special boot modes (e.g., to support software development on edge computing system 100). init 190 may be a Linux component that manages the start, initialization, and/or stop of all components of control plane virtual machine 140. Various other low-level services 154 may be included in edge computing system 100. For example, syslogd, ntpd, cron, hardware abstraction layers (HALs), boot parameters, sshd, shells and scripting languages, etc.

In addition, in various further examples, low-level services 154 may comprise a DNS server and/or an mDNS server for internal service routing since virtual IP address assignment may be dynamic. In some further examples, low-level services 154 may comprise an MQTT broker that uses a publish/subscribe model to control delivery of control plane-internal events such as signals sent between various components of control plane virtual machine 140. In some further examples, low-level services 154 may comprise low-level debugging tools such as strace, gdb, oprofile, valgrind, etc.

Figure 13:
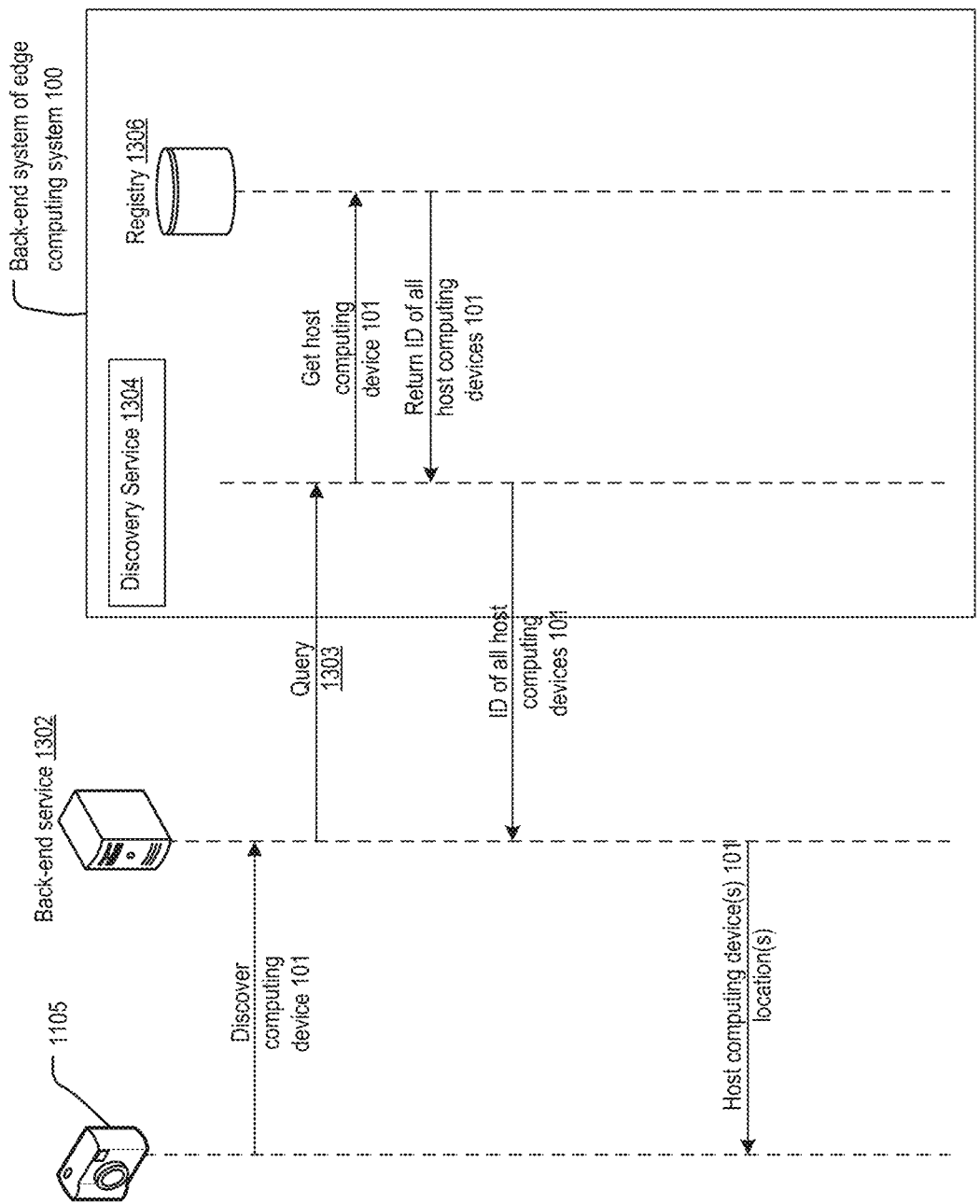
FIG. 13 is a timing diagram illustrating an example sequence for discovery of an edge computing system by another device, in accordance with various aspects of the present disclosure.

FIG. 13 is a timing diagram illustrating an example sequence for discovery of host computing device 101 of FIG. 1 by another device, in accordance with various aspects of the present disclosure.

In the example of FIG. 13, a camera may be a third party (3P) cloud camera having an associated a 3P back-end service 1302 (e.g., cloud storage, image processing, etc.). Initially, the camera 1105 may send a request over the internet to back-end service 1302 to discover computing device 101. Back-end service 1302 may send a query 1303 to a back-end system associated with edge computing system 100. In the example, the host computing device 101 (e.g., a home computing device running edge computing system 100) is registered with the back-end system, and the registration data associated with host computing device 101 may be stored in registry 1306. The query may be received by discovery service 1304. In the example of FIG. 13, both the camera and the host computing device 101 are registered to a same user, but the actual user accounts associated with each of these devices may be different. Discovery service 1304 may send user identification data (e.g., from registration information of the camera and/or from an input of authorization credentials) to registry 1306. Discovery service 1304 may receive data identifying one or more computing devices 101 associated with the user. Optionally, discovery service 1304 may send a request to registry 1306 to gather information about all installed applications for each computing device 101 associated with the user. For the received information, the discovery service 1304 may determine one or more applications associated with back-end service 1302 and/or with the camera. Thereafter, discovery service 1304 may send the data identifying computing device(s) 101, to back-end service 1302. In some examples, discovery service 1304 may also send a list of installed applications associated with back-end service 1302 to back-end service 1302. Back-end service 1302 may send the data, which may specify the network address of the computing device(s) 101, to the camera. Thereafter, the camera may initiate communication with the computing device(s) 101 based on the received network address data and/or based on communication protocols used by the installed applications associated with the camera.

Figure 14:
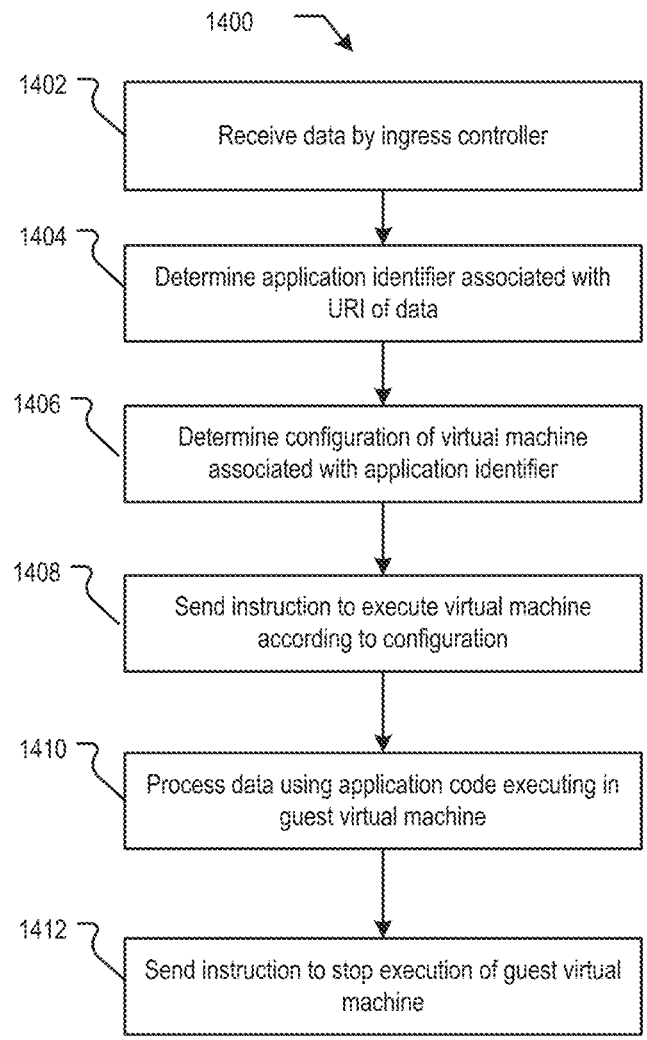
FIG. 14 depicts a flow chart showing an example process for processing a signal received by the edge computing system described herein, in accordance with various aspects of the present disclosure.

FIG. 14 depicts a flow chart showing an example process 1400 for processing data received by the host computing device 101 executing edge computing system 100, in accordance with various aspects of the present disclosure. Process 1400 may be performed, for e.g., by host computing device 101 of FIG. 1. The portions of FIG. 14 that have been previously discussed in reference to FIGS. 1-13 may not be described again for purposes of clarity and brevity. The actions of the process 1400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 1400 may begin at action 1402 where data (e.g., data received from one or more other connected devices) may be received by ingress controller 156. In an example, the data may be video data received from a camera device communicatively coupled with host computing device 101 executing edge computing system 100. In another example, the data may be speech input (e.g., a user utterance of a wakeword followed by spoken word(s)). In various examples, the input may cause edge computing system 100 to perform an action (e.g., start an application or application service to process the data, store the data, etc.). In various examples, the data may be referred to as request data. In various examples, the request data may include a URI identifying one or more applications and/or resources of edge computing system 100 to be used to process the request data.

At action 1404, ingress controller 156 may send a URI included in the received signal to an application registry to determine an application and/or service identifier associated with the signal. The application and/or service identifier may be sent to an orchestrator 166 corresponding to the identifier (e.g., a virtual machine orchestrator, a container orchestrator, a Lambda orchestrator). In various examples, at action 1406, the orchestrator 166 may specify a configuration for the particular virtual machine, container, and/or Lambda associated with the application and/or service identifier. The configuration may allocate hardware resources to the container, virtual machine, etc., determine dependencies, and sequencing. In addition, in various examples, the orchestrator 166 may convert the received data into a function call (including specification of parameters) for processing the signal by the appropriate resource (e.g., by the guest virtual machine 128 and/or by an engine virtual machine 126).

At action 1408, the orchestrator may send instructions effective to cause VM manager 168 of control plane virtual machine 140 to execute the virtual machine according to the configuration determined by orchestrator 166. VM manager 168 may, in turn, send instructions to CNC component 124 effective to cause KVM 120 to generate the virtual machine and deploy the resource (e.g., one or more containers, Lambdas, and/or other application code) within the guest virtual machine 128.

At action 1410, the data may be processed using application code executing in the guest virtual machine executed at action 1408. In various examples, processing the data may include conversion of data into a function call that calls a function executing in the newly-instantiated guest virtual machine 128.

In various embodiments, the guest virtual machine 128 may generate output data. The output data may be sent to some other component of edge computing system 100 and/or to some other device communicating with edge computing system 100 (e.g., a smart device communicating over a LAN with host computing device 101 executing edge computing system 100). At action 1412, the VM manager 168 of control plane virtual machine 140 may send instructions to CNC component 124 effective to stop execution of the guest virtual machine.

Figure 15:
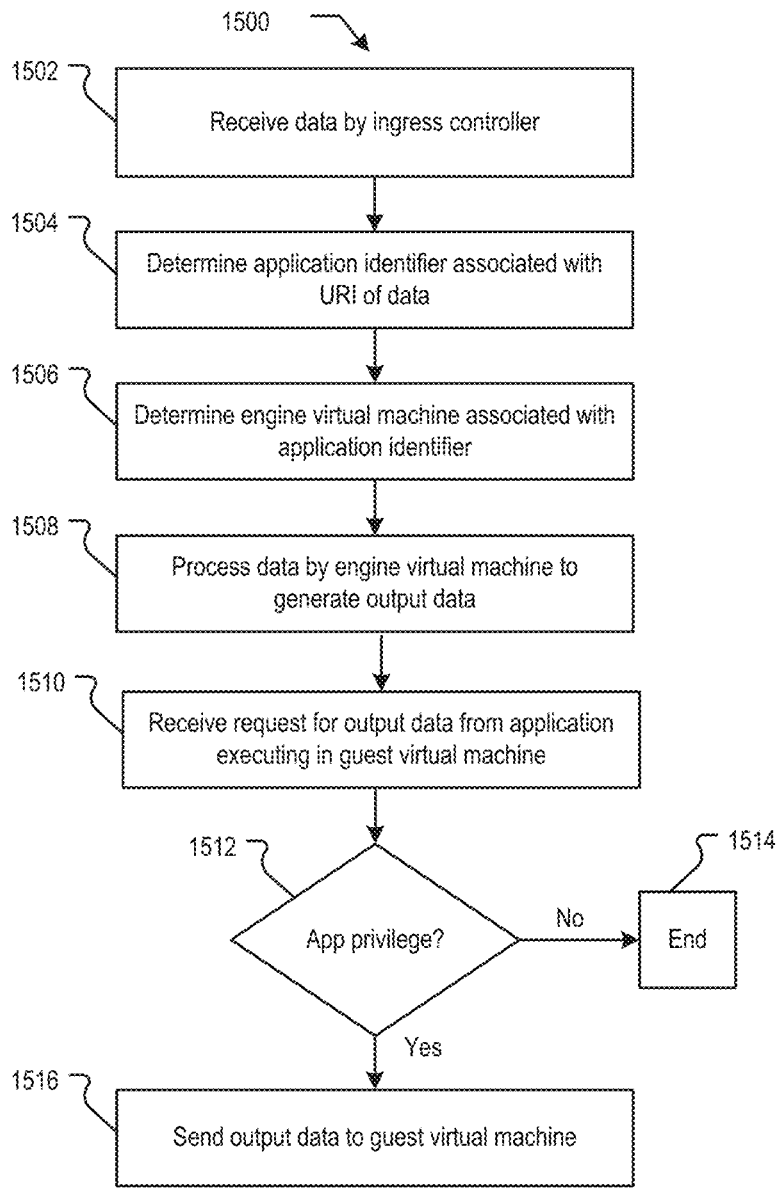
FIG. 15 depicts a flow chart showing an example process for communication between an engine virtual machine and an application executing in a guest virtual machine, in accordance with various aspects of the present disclosure.

FIG. 15 depicts a flow chart showing an example process 1500 for communication between an engine virtual machine 126 and a guest virtual machine 128 executing on the edge computing system 100, in accordance with various aspects of the present disclosure. Those portions of FIG. 15 that have been previously discussed in reference to FIGS. 1-14 may not be described again for purposes of clarity and brevity. The actions of the process 1500 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 1500 may begin at action 1502, at which data (e.g., data received over the LAN by host computing device 101 executing edge computing system 100 from one or more other connected devices) may be received by ingress controller 156. In an example, the received data may be video data received from a camera device configured in communication with host computing device 101 executing edge computing system 100. In another example, the received signal may be speech input (e.g., a user utterance of a wakeword followed by spoken word(s)). In various examples, the input may cause edge computing system 100 to perform an action (e.g., start an application or application service to process the data, store the data, etc.). In various examples, the request data may include a URI identifying one or more applications and/or resources of edge computing system 100 to be used to process the request data.

At action 1504, ingress controller 156 may send a URI included in the received data to application registry 402 to determine an application and/or service identifier associated with the data. At action 1506, a determination may be made that an engine virtual machine 126 is associated with the application identifier. For example, an inference engine as described above in FIG. 11 and/or a speech processing system as described above in reference to FIG. 12 may be associated with the application identifier.

At action 1508, the signal may be processed by the particular engine virtual machine 126 according to the functionality of the particular engine virtual machine 126. For example, if the engine virtual machine 126 is configured to detect objects in video, the engine virtual machine may execute one or more convolutional neural networks deployed in one or more containers executing within the engine virtual machine. Output data may indicate the classification of an object detected in one or more frames of video data and the location of the object within the frame. In another example, if the engine virtual machine 126 is a speech processing engine, the engine virtual machine may perform ASR, NLU, and/or skill-specific processing to determine one or more actions to take in response to the received signal (which may be audio data representing a spoken user command in the current example). The output data may be executable control inputs effective to generate the action to be taken (e.g., a control instruction effective to turn on a light in Response to a spoken user command "Computer, turn on the living room light.").

At action 1510, a guest virtual machine 128 may request access to the output data (e.g., through an API of the particular engine virtual machine 126 that has generated the output data). In various examples, permission service 172 may be used to determine whether or not the particular guest virtual machine 128 (and/or application executing thereon) is permitted to access the output data. In at least some examples, payload service 180 may provide the data in a shared memory location accessible by applications with the necessary permissions. Accordingly, at action 1512 a determination may be made whether or not the application requesting the output data is privileged to access and/or receive the output data.

If so, processing may continue to action 1516, and the output data may be sent (or otherwise be made accessible to) the requesting guest virtual machine 128. Conversely, if the requesting guest virtual machine 128 does not have the necessary permissions the data may be inaccessible by the requesting guest virtual machine 128 and the process may end (action 1514).

In at least some examples, allowing engine virtual machines 126 access to sensitive user data such as voice data and/or video data may provide increased user privacy and security as such data may be processed locally by host computing device 101 executing edge computing system 100 without sending the data over the Internet to back-end services. This may enable users to maintain control over their personal data. Additionally, in some cases the engine virtual machines 126 may only provide the final output of their respective services to guest virtual machines 128, thereby restricting access to the underlying raw data, which may be sensitive. For example, the inference engine virtual machine described above in FIG. 11 may be the only virtual machine that is permitted to receive raw video data to maintain user privacy and data security.

Figure 16:
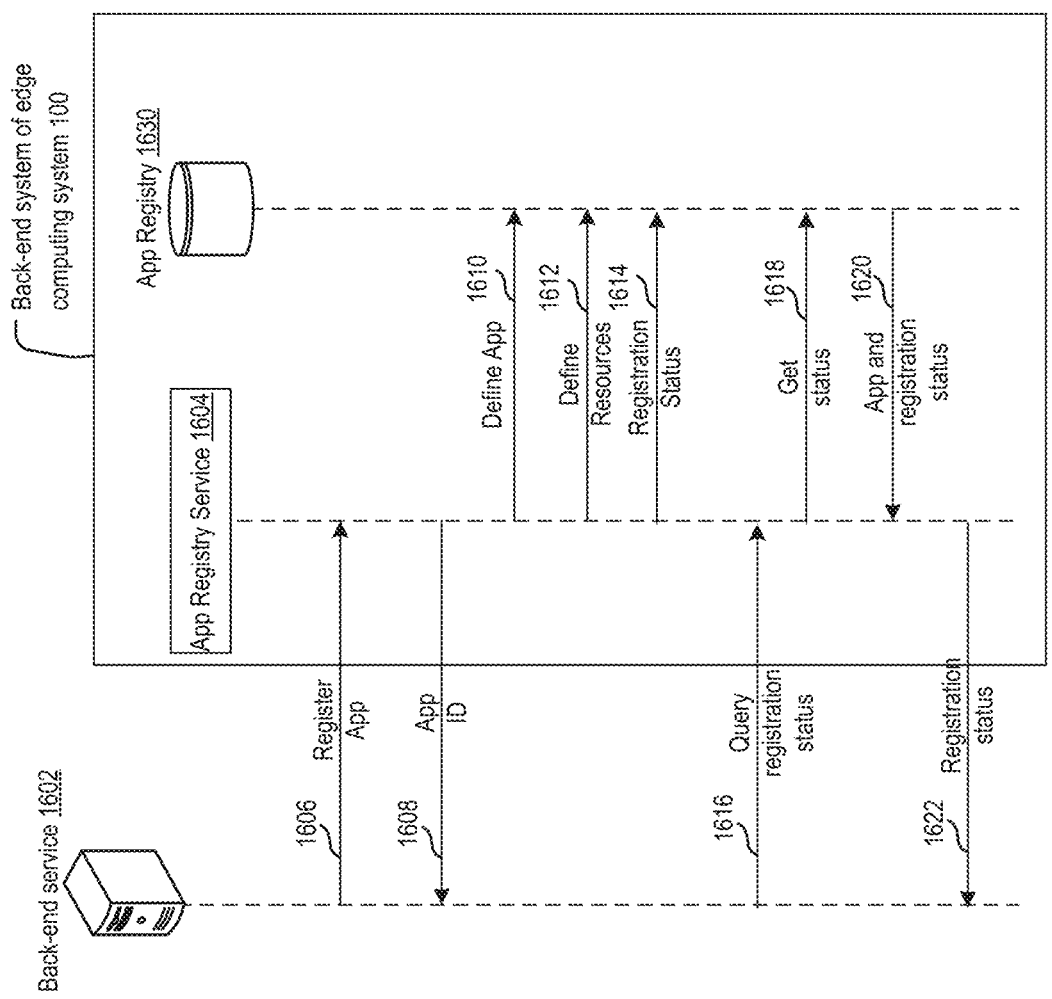
FIG. 16 is a timing diagram illustrating an example sequence for registration of an application with an edge computing system computing device, in accordance with various aspects of the present disclosure.

FIG. 16 is a timing diagram illustrating an example sequence for registering a 3P application with an edge computing system 100 (FIG. 1), in accordance with various aspects of the present disclosure.

At action 1606, the back-end service 1602 associated with a device communicatively coupled to host computing device 101 executing edge computing system 100 may define the application and/or resources required by the application and may send a registration request to application registry service 1604 via an API. The registration request may include the application definition and information about requested resources. The application definition may include data identifying dependencies of the application, if any. At action 1608 the application registry service 1604 may respond to the back-end service 1602 with an application identifier associated with the application. At action 1610, the application registry service 1604 may store the application definition, including any dependencies, in application registry 1630. Similarly, at action 1612, information about the resources defined for the application may be stored in application registry 1630. Application registry service 1604 may verify access by the application being registered to any external services (e.g., services available over the Internet) and may update the registration status at action 1614.

Actions 1616-1622 are an example sequence for querying registration status by a back-end service 1602 (e.g., by a third party developer). At action 1616, a query for the registration status of a particular application may be sent using the application identifier (e.g., from action 1608). Application registry service 1604 may receive the query and may use the application identifier to query application registry 1630 at action 1618. At action 1620 the application definition and/or registration status may be returned. At action 1622, application registry service 1604 may return the registration status to back-end service 1602.

Figure 17:
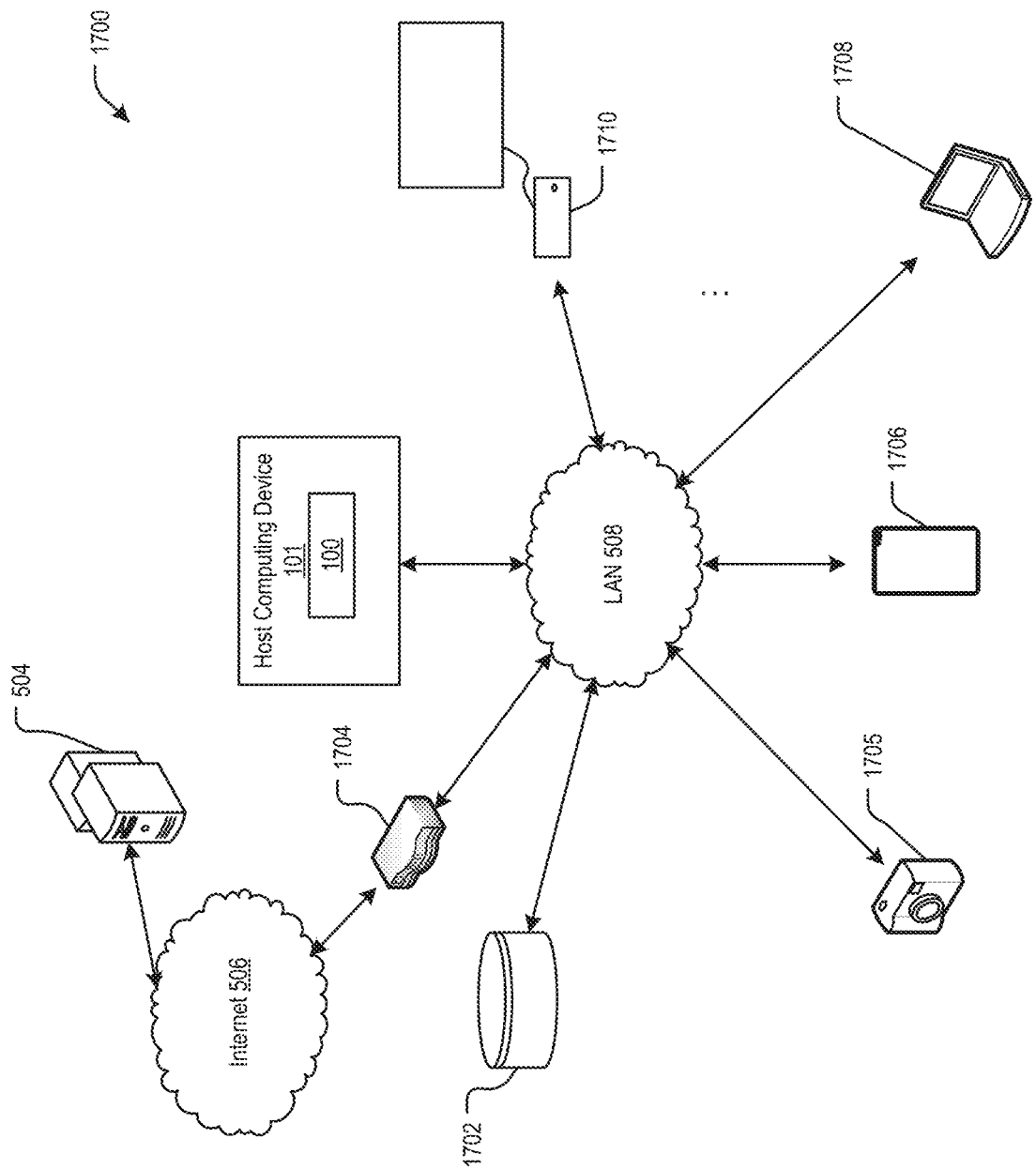
FIG. 17 is a diagram showing an example of an environment in which the edge computing system may be employed, in accordance with various aspects of the present disclosure.

FIG. 17 is a diagram showing an example of an environment 1700 in which the edge computing system 100 may be employed, in accordance with various aspects of the present disclosure. The environment 1700 includes several example computing devices that may communicate with edge computing system 100 executing on host computing device 101. The example computing devices 1702, 1704, 1706, 1708, 1710 shown in FIG. 17 may be in communication with one another via the LAN 508. The various computing devices 1702, 1704, 1706, 1708, 1710 may be smart devices that may have companion applications and/or processes that may be executed by guest virtual machines 128, engine virtual machines 126, and/or primitives deployed by edge computing system 100. In some embodiments, the host computing device 101 and computing devices 1702, 1704, 1706, 1708, 1710 are deployed on a LAN 508 within a residential household.

The example computing devices 1702, 1704, 1706, 1708, 1710 may communicate with one or more back-end computing devices 504 through an access point (e.g., example computing device 1704, such as a router) configured to access internet 506. In various examples, back-end computing devices 504 may be associated with various ones of the computing devices 1702, 1704, 1706, 1708, 1710 and/or with host computing device 101 executing edge computing system 100. For example, the back end services may perform compute operations associated with example computing devices 1702, 1704, 1706, 1708, 1710 and/or associated with host computing device 101 executing edge computing system 100.

Although particular computing devices 1702, 1704, 1706, 1708, 1710 are depicted in FIG. 17 and described below, different types of computing devices may be used without departing from the disclosure. For example, any computing devices configured to communicate with other computing devices over a network (e.g., Internet of Things devices) may be used in accordance with the protocols, systems, and methods described herein. In some examples, computing devices which may be used in accordance with the protocols, systems, and methods described herein may include automobiles, thermostats, appliances, lighting systems, heating/cooling devices, refrigerators, camera systems, voice assistant systems, mobile computing devices, speakers, robots, and/or other household goods with integrated networking technology.

An example computing device 1710 may be a media player connected to a television or other suitable media device for playing back audio, video, or other media. The example computing device 1710 may comprise a processor and associated data storage. The example computing device 1710 may also comprise suitable input/output devices such as, switches or buttons for activating and/or configuring the example computing device 1710, a display for providing a status of the example computing device 1710, etc. The example computing device 1710, in some examples, may store media data and/or may download media data from a remote computing device, such as back-end computing device 504. Media data stored and/or downloaded to the example computing device 1710 may be displayed at a television or other suitable output device.

An example voice assistant-enabled computing device 1702 may comprise one or more microphones (e.g., an array of microphones) and may be effective to receive voice commands/requests and send the voice commands/requests to computing device 101 and/or a back-end computing device 504 for further processing and/or to generate a response and/or an action in response to the voice command/request.

An example digital camera computing device or digital camera 1705 may be any suitable device configured to capture an image and/or video. The digital camera 1705 may have one or more than one image sensor and may have a standard or panoramic field-of-view. In some examples, the digital camera 1705 may be configured to communicate with other components of the environment 1700 via the LAN 508. For example, the digital camera 1705 may upload images and/or videos to the host computing device 101 executing edge computing system 100 or other component of the environment 1700 for storage, processing, etc. In various examples, digital camera 1705 may comprise one or more networked security cameras effective to monitor a physical environment (e.g., various rooms in a home) and may be effective to detect motion and send video to computing device 101, one or more back-end computing devices 504, mobile computing device 1706, and/or some other device(s) for further processing, for storage, and/or for display.

An example mobile computing device 1706 may be any suitable type of computing device comprising at least one processor and data storage. In some examples, the mobile computing device 1706 may comprise one or more image sensors and associated optics for capturing an image or video. In some examples, the mobile computing device 1706 may be configured to communicate on a cellular or other telephone network in addition or instead of the LAN 508. Also, in some examples, the mobile computing device 1706 may be configured to access the internet 506 via the cellular or other telephone network. An example other computing device 1708 may be any suitable type of computing device comprising a processor and data storage including, for example, a laptop computer, a desktop computer, etc. In some examples, the computing device 1708 may comprise one or more image sensors and associated optics for capturing an image or video.

Various other Internet-of-things devices (e.g., smart devices) may be employed in environment 1700 in accordance with the present disclosure. Advantageously, the various devices communicating with host computing device 101 executing edge computing system 100 may be developed by different manufacturers and different software developers and may deploy functionality in a secure and modular manner through edge computing system 100. Edge computing system 100 may provide security by running guest applications in separate virtual machines. Additionally, using the particular virtual machine instantiations described herein (e.g., Firecracker lightweight virtual machines, and/or container-based virtualized environments), edge computing system may launch virtual machines and perform guest application processing at near native speeds. Additionally, edge computing system may dynamically deploy guest virtual machines 128 in response to a trigger event and/or in response to a workload input without being required to continually execute every installed guest virtual machine. Furthermore, edge computing system 100 may include logic effective to oversubscribe to host hardware in order to optimally allocate resources and CPU scheduling.

Figure 18:
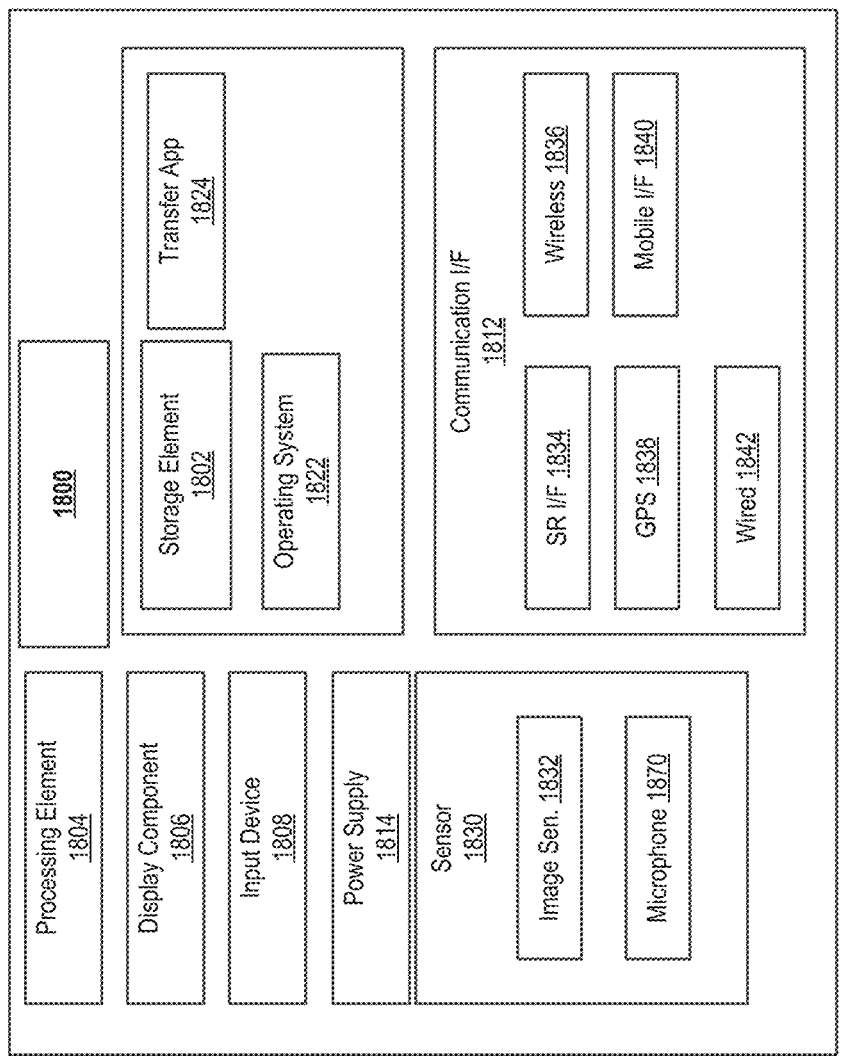
FIG. 18 is a block diagram of an example computing device architecture that may be used in accordance with various aspects of the present disclosure.

FIG. 18 is a block diagram showing an example architecture 1800 of a computing device that may be used, in accordance with various aspects of the present disclosure. For example, architecture 1800 may represent, at least in part, a computing architecture of a smart device configured in communication with host computing device 101 executing edge computing system 100. In some other examples, architecture 1800 may represent, at least in part, a computing architecture of host computing device 101 upon which edge computing system 100 is executed. It will be appreciated that not all devices will include all of the components of the architecture 1800 and some devices may include additional components not shown in the architecture 1800. The architecture 1800 may include one or more processing elements 1804 for executing instructions and retrieving data stored in a storage element 1802. The processing element 1804 may comprise at least one processor. Any suitable processor or processors may be used. For example, the processing element 1804 may comprise one or more digital signal processors (DSPs). The storage element 1802 can include one or more different types of memory, data storage, or computer-readable storage media devoted to different purposes within the architecture 1800. For example, the storage element 1802 may comprise flash memory, random-access memory, disk-based storage, etc. Different portions of the storage element 1802, for example, may be used for program instructions for execution by the processing element 1804, storage of images or other digital works, and/or a removable storage for transferring data to other devices, etc. Additionally, storage element 1802 may store segmentation masks generated using the object co-segmentation techniques described herein.

The storage element 1802 may also store software for execution by the processing element 1804. An operating system 1822 may provide the user with an interface for operating the computing device and may facilitate communications and commands between applications executing on the architecture 1800 and various hardware thereof. A transfer application 1824 may be configured to receive images, audio, and/or video from another device (e.g., a mobile device, image capture device, and/or display device) or from an image sensor 1832 and/or microphone 1870 included in the architecture 1800.

When implemented in some user devices, the architecture 1800 may also comprise a display component 1806. The display component 1806 may comprise one or more light-emitting diodes (LEDs) or other suitable display lamps. Also, in some examples, the display component 1806 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 1806 may be effective to display input images and/or segmentation masks generated in accordance with the various techniques described herein.

The architecture 1800 may also include one or more input devices 1808 operable to receive inputs from a user. The input devices 1808 can include, for example, a push button, touch pad, touch screen, wheel, joystick, keyboard, mouse, trackball, keypad, light gun, game controller, or any other such device or element whereby a user can provide inputs to the architecture 1800. These input devices 1808 may be incorporated into the architecture 1800 or operably coupled to the architecture 1800 via wired or wireless interface. In some examples, architecture 1800 may include a microphone 1870 or an array of microphones for capturing sounds, such as voice requests. In various examples, audio captured by microphone 1870 may be streamed to external computing devices via communication interface 1812.

When the display component 1806 includes a touch-sensitive display, the input devices 1808 can include a touch sensor that operates in conjunction with the display component 1806 to permit users to interact with the image displayed by the display component 1806 using touch inputs (e.g., with a finger or stylus). The architecture 1800 may also include a power supply 1814, such as a wired alternating current (AC) converter, a rechargeable battery operable to be recharged through conventional plug-in approaches, or through other approaches such as capacitive or inductive charging.

The communication interface 1812 may comprise one or more wired or wireless components operable to communicate with one or more other computing devices. For example, the communication interface 1812 may comprise a wireless communication module 1836 configured to communicate on a network according to any suitable wireless protocol, such as IEEE 802.11 or another suitable wireless local area network (WLAN) protocol. A short range interface 1834 may be configured to communicate using one or more short range wireless protocols such as, for example, near field communications (NFC), Bluetooth, Bluetooth LE, etc. A mobile interface 1840 may be configured to communicate utilizing a cellular or other mobile protocol. A Global Positioning System (GPS) interface 1838 may be in communication with one or more earth-orbiting satellites or other suitable position-determining systems to identify a position of the architecture 1800. A wired communication module 1842 may be configured to communicate according to the USB protocol or any other suitable protocol.

The architecture 1800 may also include one or more sensors 1830 such as, for example, one or more position sensors, image sensors, and/or motion sensors. An image sensor 1832 is shown in FIG. 18. Some examples of the architecture 1800 may include multiple image sensors 1832. For example, a panoramic camera system may comprise multiple image sensors 1832 resulting in multiple images and/or video frames that may be stitched and may be blended to form a seamless panoramic output. An example of an image sensor 1832 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 101, and/or the various other computing devices described herein, are exemplary, and may be located as a stand-alone device or may be included, in whole or in part, as a component of a larger device or system.

In the descriptions provided herein, each type or configuration of computing resource may be available in different sizes, such as large resources—consisting of many processors, large amounts of memory and/or large storage capacity—and small resources—consisting of fewer processors, smaller amounts of memory and/or smaller storage capacity.

The availability of virtualization technologies for computing hardware has afforded benefits for providing large scale computing resources for customers and allowing computing resources to be efficiently and securely shared between multiple customers. For example, virtualization technologies may enable a physical computing device to be shared among multiple users and/or guest applications by providing each user/guest application with one or more virtual machine (e.g., Firecracker virtual machines) and/or containers hosted by the physical computing device. A virtual machine may be a software emulation of a particular physical computing system that acts as a distinct logical computing system. Such a virtual machine provides isolation among multiple operating systems sharing a given physical computing resource. Furthermore, some virtualization technologies may provide virtual resources that span one or more physical resources, such as a single virtual machine with multiple virtual processors that span multiple distinct physical computing systems.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A system comprising:
a host kernel comprising a kernel-based virtual machine hypervisor;
virtualization software effective to communicate with the kernel-based virtual machine hypervisor to execute virtual machines;
an engine virtual machine provisioned with access to at least one hardware component of the system; and
a control plane virtual machine comprising:
a controller component effective to receive a first request and determine an application corresponding to the first request; and
a virtual machine manager effective to cause the virtualization software to execute a first guest virtual machine for executing the application.

2. The system of claim 1, further comprising instructions that when executed by at least one processor are effective to program the at least one processor to:
receive, by the control plane virtual machine from the first guest virtual machine, a second request to access the engine virtual machine;
determine, by the control plane virtual machine, that the first guest virtual machine is authorized to access the engine virtual machine;
sending, by the first guest virtual machine, the second request to the engine virtual machine for processing; and
processing, by the engine virtual machine using the at least one hardware component, the second request to generate output data.

3. The system of claim 1, further comprising instructions that when executed by at least one processor are effective to program the at least one processor to:
receive, by the controller component, a second request;
determine, by the controller component, that the second request is associated with a second application;
determine a configuration of a second guest virtual machine associated with the second application;
send, by the virtual machine manager, an instruction to the host kernel to execute the second guest virtual machine in accordance with the configuration;
execute, by the host kernel, the second guest virtual machine;
send the second request to the second guest virtual machine; and
process the second request by the second guest virtual machine.

4. The system of claim 1, further comprising instructions that when executed by at least one processor are effective to program the at least one processor to execute the first guest virtual machine for executing the application in response to data sent by a device on a local area network, where the device is associated with the application.

5. The system of claim 1, wherein the engine virtual machine comprises:
a first container image executing an automatic speech recognition model effective to generate text data from input audio data; and
a second container image executing a natural language understanding model effective to determine a semantic interpretation of the text data, wherein the engine virtual machine is communicatively coupled to a remote speech processing system.

6. The system of claim 1, further comprising instructions that when executed by at least one processor are effective to program the at least one processor to:
receive, from the first guest virtual machine, a request for data from a second guest virtual machine;
determine that the first guest virtual machine is authorized to receive the data from the second guest virtual machine; and
send the data from the first guest virtual machine to the second guest virtual machine.

7. A computing device comprising:
at least one processor; and
at least one non-transitory computer-readable memory configured in communication with the at least one processor, the at least one non-transitory computer-readable memory storing instructions that, when executed by the at least one processor, are effective to program the at least one processor to:
execute a host kernel comprising a kernel-based virtual machine hypervisor;
execute virtualization software effective to communicate with the kernel-based virtual machine hypervisor to execute virtual machines;
execute an engine virtual machine having access to at least one hardware component; and
execute a control plane virtual machine comprising:
a controller component effective to receive a first request and determine an application corresponding to the first request; and
a virtual machine manager effective to cause the virtualization software to execute a first guest virtual machine for executing the application.

8. The computing device of claim 7, wherein the at least one non-transitory computer-readable memory stores further instructions that, when executed by the at least one processor, are further effective to:
receive, by the control plane virtual machine from the first guest virtual machine, a second request to access the engine virtual machine;
determine, by the control plane virtual machine, that the first guest virtual machine is authorized to access the engine virtual machine;
send, by the first guest virtual machine, the second request to the engine virtual machine for processing; and
process, by the engine virtual machine using the at least one hardware component, the second request to generate output data.

9. The computing device of claim 7, wherein the at least one non-transitory computer-readable memory stores further instructions that, when executed by the at least one processor, are further effective to:
receive, by the controller component, a second request;
determine, by the controller component, that the second request is associated with a second application;
determine a configuration of a second guest virtual machine associated with the second application;
send, by the virtual machine manager, an instruction to the host kernel to execute the second guest virtual machine in accordance with the configuration;

execute, by the host kernel, the second guest virtual machine;
send the second request to the second guest virtual machine; and
process the second request by the second guest virtual machine.

10. The computing device of claim 7, wherein the at least one non-transitory computer-readable memory stores further instructions that, when executed by the at least one processor, are further effective to execute the first guest virtual machine for executing the application in response to data sent by a device on a local area network, where the device is associated with the application.

11. The computing device of claim 7, wherein the engine virtual machine comprises:
   a first container image executing an automatic speech recognition model effective to generate text data from input audio data; and
   a second container image executing a natural language understanding model effective to determine a semantic interpretation of the text data, wherein the engine virtual machine is communicatively coupled to a remote speech processing system.

12. The computing device of claim 7, wherein the at least one non-transitory computer-readable memory stores further instructions that, when executed by the at least one processor, are further effective to:
   receive, from the first guest virtual machine, a request for data from a second guest virtual machine;
   determine that the first guest virtual machine is authorized to receive the data from the second guest virtual machine; and
   send the data from the first guest virtual machine to the second guest virtual machine.

13. A method comprising:
   executing, by at least one processor, a host kernel comprising a kernel-based virtual machine hypervisor;
   executing virtualization software effective to communicate with the kernel-based virtual machine hypervisor to execute virtual machines;
   executing a engine virtual machine having access to at least one hardware component; and
   executing a control plane virtual machine comprising:
      a controller component effective to receive a first request and determine an application corresponding to the first request; and
      a virtual machine manager effective to cause the virtualization software to execute a first guest virtual machine for executing the application.

14. The method of claim 13, further comprising:
   receiving, by the control plane virtual machine from the first guest virtual machine, a second request to access the engine virtual machine;
   determining, by the control plane virtual machine, that the first guest virtual machine is authorized to access the engine virtual machine;
   sending, by the first guest virtual machine, the second request to the engine virtual machine for processing; and
   processing, by the engine virtual machine using the at least one hardware component, the second request to generate output data.

15. The method of claim 13, further comprising:
   receiving, by the controller component, a second request;
   determining, by the controller component, that the second request is associated with a second application;
   determining a configuration of a second guest virtual machine associated with the second application;
   sending, by the virtual machine manager, an instruction to the host kernel to execute the second guest virtual machine in accordance with the configuration;
   executing, by the host kernel, the second guest virtual machine;
   sending the second request to the second guest virtual machine; and
   process the second request by the second guest virtual machine.

16. The method of claim 13, further comprising executing the first guest virtual machine for executing the application in response to data sent by a device on a local area network, where the device is associated with the application.

17. The method of claim 13, further comprising:
   executing, by the engine virtual machine, a first container image executing an automatic speech recognition model effective to generate text data from input audio data; and
   executing, by the engine virtual machine, a second container image executing a natural language understanding model effective to determine a semantic interpretation of the text data, wherein the engine virtual machine is communicatively coupled to a remote speech processing system.

18. The method of claim 13, further comprising:
   receiving, from the first guest virtual machine, a request for data from a second guest virtual machine;
   determining that the first guest virtual machine is authorized to receive the data from the second guest virtual machine; and
   sending the data from the first guest virtual machine to the second guest virtual machine.

19. The method of claim 13, further comprising:
   executing the engine virtual machine configured with access to a graphics processing unit (GPU);
   sending video data to the engine virtual machine;
   determining, by the engine virtual machine, object data identifying a first object represented in the video data; and
   sending the object data to the engine virtual machine.

20. The method of claim 13, further comprising:
   receiving a request to install an application;
   determining a resource associated with the application;
   storing identifier data identifying the resource in an application registry in association with a uniform resource identifier; and
   installing the application in memory.

* * * * *